United States Patent
Panja et al.

(10) Patent No.: US 7,518,511 B1
(45) Date of Patent: Apr. 14, 2009

(54) DYNAMIC PRODUCT TRACKING SYSTEM USING RFID

(76) Inventors: Ravi Panja, 5793 Cannes Pl., San Jose, CA (US) 95138; Ashish Chona, 18822 Bellgrove Cir., Saratoga, CA (US) 95070; Ye Zhou, 4513 Carlyle Ct., # 313, Santa Clara, CA (US) 95054; Leif Chastaine, 114 W. Cornll Ct., Meridian, ID (US) 83642

( * ) Notice: Subject to any disclaimer, the term of this patent is extended or adjusted under 35 U.S.C. 154(b) by 239 days.

(21) Appl. No.: 11/367,024

(22) Filed: Mar. 1, 2006

Related U.S. Application Data

(60) Provisional application No. 60/657,915, filed on Mar. 1, 2005.

(51) Int. Cl.
    *G08B 13/14* (2006.01)
(52) U.S. Cl. ............ 340/572.1; 340/568.1; 340/539.13; 340/825.69
(58) Field of Classification Search ............... 340/572.1, 340/5.92, 568.1, 5.1, 10.1, 531, 539.1, 5.9, 340/539.13, 825.49, 572.8, 505, 501, 825.69, 340/572.7; 705/1, 16, 22; 235/380, 381
See application file for complete search history.

(56) References Cited

U.S. PATENT DOCUMENTS

| | | | | |
|---|---|---|---|---|
| 7,053,773 | B2 * | 5/2006 | McGarry et al. | 340/568.1 |
| 7,053,777 | B2 * | 5/2006 | Allen | 340/572.1 |
| 2005/0229227 | A1 * | 10/2005 | Rogers | 725/115 |

* cited by examiner

*Primary Examiner*—Daniel Previl
(74) *Attorney, Agent, or Firm*—Ash Tankha

(57) ABSTRACT

A dynamic product tracking system uses RFID (radio frequency identification) to provide real time updates regarding item-level product movements, enriches the received RFID scan data with master and associative data, and stores the resulting enriched data in a product tracking server database. The product tracking server also stores static reference data, pre-defined rules or queries, generates pre-defined messages for delivery to other business management (e.g., ERP, accounting, and EDI) systems, and responds to ad hoc, online user inquiries and tracking requests. In a preferred embodiment, a model or state machine representation of the system is used.

6 Claims, 30 Drawing Sheets

RFID SCAN RECORD FROM
CONTROL NODE

| |
|---|
| MANUFACTURER: EAN.UUC |
| PRODUCT TYPE: 00235 |
| SERIAL NUMBER: 12345 |
| LOCATION: 03 |
| SCAN-TIME: 2005-01-17-08:47:23 PST |
| DIRECTION: ARRIVED |
| |
| |

FIGURE 5

DYNAMIC PRODUCT TRACKING SYSTEM USING RFID

RELATED APPLICATIONS

This patent application claims the priority of U.S. provisional patent application Ser. No. 60/657,915 by inventors Ravi Panja, Ashish Chona, Ye Zhou, and Leif Chastaine entitled Dynamic Product Tracking System Using RFID filed on Mar. 1, 2005.

BACKGROUND OF THE INVENTION

1. Field of the Invention

This invention is related to software for business supply chains, particularly when using RFID or similar tagging of products and components.

2. Description of the Prior Art

Large business enterprises are trying to become more efficient in the way they conduct business. Globalization is driving a major set of changes, including outsourcing of non-core business activities to external suppliers, manufacturers, logistics, and other business partner organizations.

Mature software application systems are available for business process and inventory tracking and modeling. These include ERP (enterprise resources planning) packages such as SAP, as well as many other inventory, accounting, manufacturing, and bill of materials systems. However, these systems are primarily focused on tracking the quantity of a given item, by its SKU (stock keeping unit), by storage and use locations.

To provide for more flexible partner and supplier arrangements, it is often desirable to employ an outside company to manage inventory, such as (e.g.) the manufacturer of that product, or a repair service that has control of the product while it is being repaired or refurbished. It is also desirable to track specific item-level data, including but not limited to serial numbers, product warranties, expire dates, product properties (pH, temperature, humidity). Such tracking can provide more efficient management of large inventories in multiple locations on behalf of multiple parties.

RFID (radio frequency identification) technology provides item, carton, or pallet level tags that contain an integrated circuit chip, an internal data state, and an antenna. Upon receiving a pulse of electromagnetic energy, the RFID Tag will become energized, and will broadcast a radio signal containing its internal data in a pre-defined encoded format. Some tags can also (a) perform and relay physical readings, such as temperature, humidity, or pH (acidity), and/or (b) allow information to be written back to the tag, which will then be broadcast upon subsequent reading of the tag. Extensive published information is available regarding RFID tag and reader technology.

Therefore to perform more accurate and useful tracking of inventory and other items,—moving within a business enterprise, it is desirable to (a) read the RFID tags of products at control nodes in designated areas at remote warehouse locations and transmit the resulting data to a central product tracking server, (b) receive and enrich the data so received, by adding master reference and associative data, (c) store pre-defined rules regarding product tracking events, (d) provide messages to other business systems (such as ERP, accounting, or EDI systems) in pre-defined formats, and (e) provide an ad hoc item level product inquiry, tracking, and reporting capability for online enterprise users.

Timely and detailed (enriched) item level tracking can (e.g.) allow a supplier to deliver a substantial level of tracking services along with their product, thus in a sense converting the product into a "service," i.e., the product is always available at the customer's site, in the appropriate quantities, with no additional actions needing to be taken by the customer, much like the way that natural gas (product) is delivered to a gas stove, yet is considered as a utility service.

Note: The term "enterprise" refers generally to large multi-functional organizations, which may be for-profit, non-profit, or governmental, usually with multiple locations, multiple business processes or functions, and large numbers (often thousands) of employees. Such organizations have come to rely critically on electronic accounting and inventory systems to control inventory and other processes, since these are generally too complex for any individual(s) to understand.

BRIEF DESCRIPTION OF THE DRAWINGS

FIG. 5 shows the layout of an electronic data record generated by an RFID control node and transmitted to an RFID tracking server.

DETAILED DESCRIPTION OF THE PREFERRED EMBODIMENTS

Figure 1:
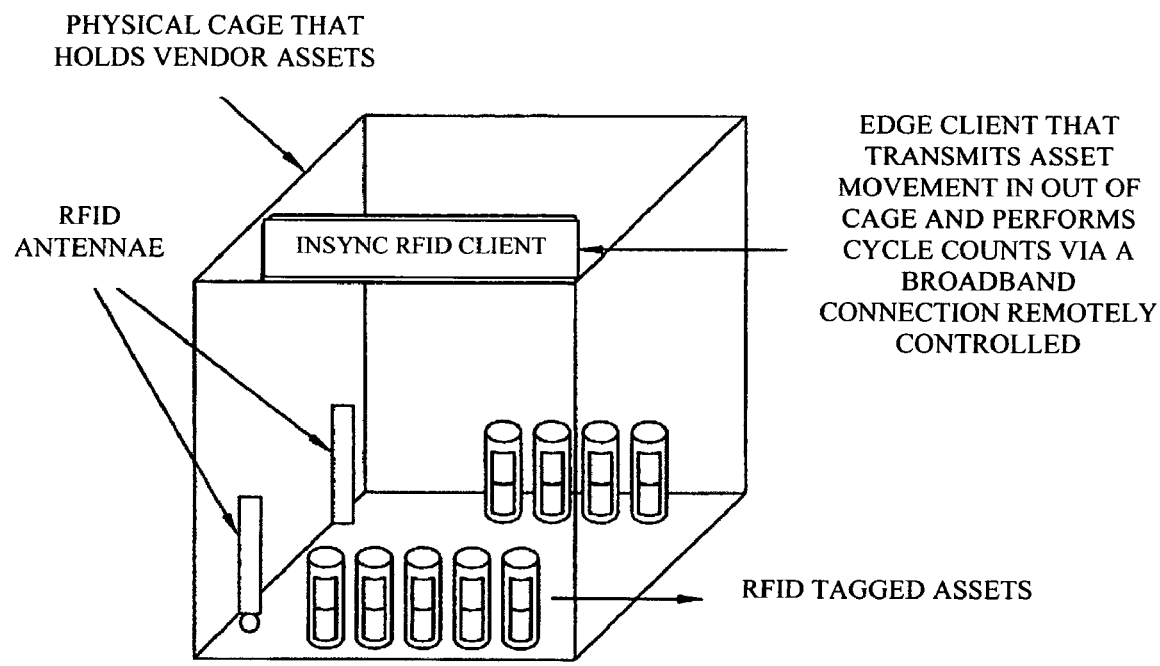
FIG. 1 shows a perspective schematic drawing of a physical cage (e.g., at a warehouse location) holding vendor assets bearing RFID tags. An RFID Client (sometimes also called an "Edge Client" or "Control Node") receives and processes signals from a plurality of RFID antennae.
Figure 2:
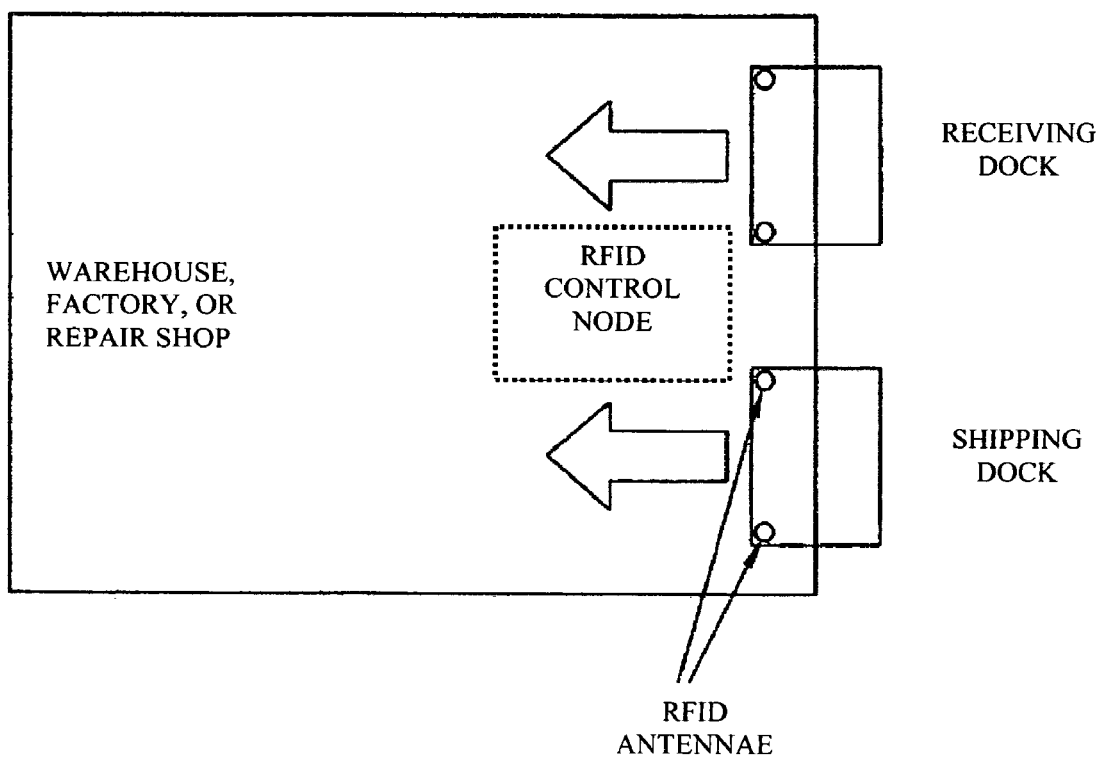
FIG. 2 shows an overhead schematic drawing of a warehouse, factory, or repair shop having two loading docks, one for shipping and another for receiving. An RFID Control Node receives and processes signals from a plurality of RFID antennae.
Figure 3:
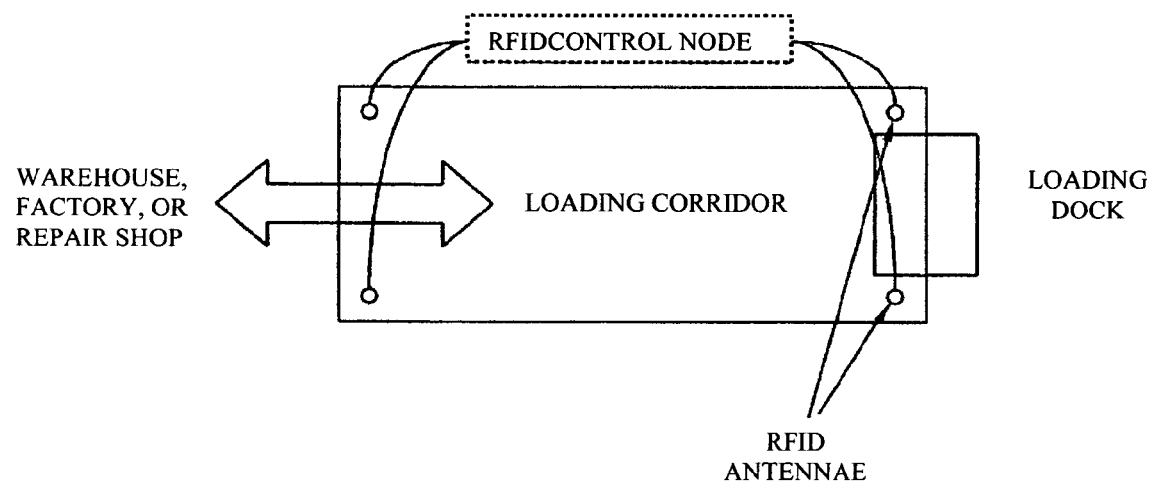
FIG. 3 shows an overhead schematic drawing of a loading corridor having two RFID detection areas, one proximate to a warehouse, factory, or repair shop work area, and the other proximate to a loading dock. An RFID Control Node receives and processes signals from a plurality of RFID antennae.

As depicted in FIGS. 1-3 a control node consists of a plurality of RFID reader antennae, connected to a local control computer, which may be a personal computer. The control nodes can have various configurations, depending on the application needs, and the funding available for its construction.

FIG. 1 shows a node that simply monitors a cage containing RFID tagged assets. FIG. 2 shows a warehouse or other building where the receiving and shipping docks are separately monitored, such that the appearance of a tagged item at the receiving dock can be interpreted as an arrival to the facility, and its appearance at the shipping dock can be interpreted as a departure from the facility. FIG. 3 shows a control node that monitors a loading or delivery corridor, such that the appearance of a tagged item first at the dock and then entering the floor area can be interpreted as an arrival to the facility, and its appearance first at the floor area and then at the dock can be interpreted as a departure from the facility. Many other plans or layouts can be used for the control nodes.

Figure 4:
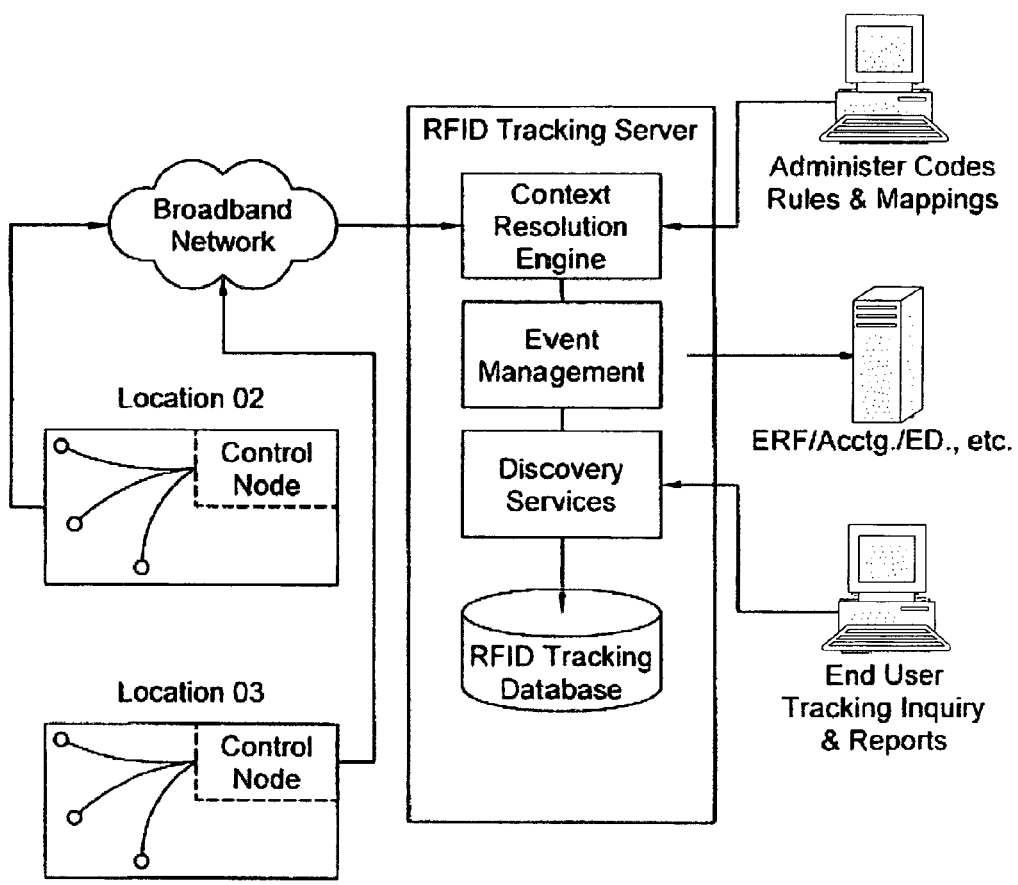
FIG. 4 is a schematic diagram showing the relationship of the RFID control nodes, the RFID tracking server, and other related systems. The RFID control nodes transmit information from recent item scans to the RFID Tracking Server via a broadband internet or similar long-distance network connection.

FIG. 4 shows an overall schematic diagram of the configuration of equipment used to carry out the method and systems described. A plurality of control nodes are constructed at locations where it is desired to monitor in real time the arrival and departure of RFID tagged assets or materials. Each control node has at least one computer, which may be a personal computer, that can take readings from the RFID antennae, and transmit a message over a broadband network (e.g., the Internet) for each arrival or departure of a tagged asset, such message to be received by the RFID Tracking Server. The item tracking data messages can also be stored temporarily on a local data storage medium (e.g., hard drive or flash memory) on the node computer in case the network is non-functional.

FIG. 5 shows a sample data layout for an RFID tracking message to be transmitted from the control node to the RFID Tracking Server.

Returning to FIG. 4, the RFID Tracking Server may be housed in one server computer, or on a high availability cluster, and may be replicated at multiple locations for disaster recovery and fault tolerance. It contains an RFID Tracking Database, which may be stored on a hard drive mass storage subsystem and controlled by a database control program (such as Oracle or MySql). One or more server program processes receive the incoming RFID item tracking messages. These server program processes include—

Figure 6:
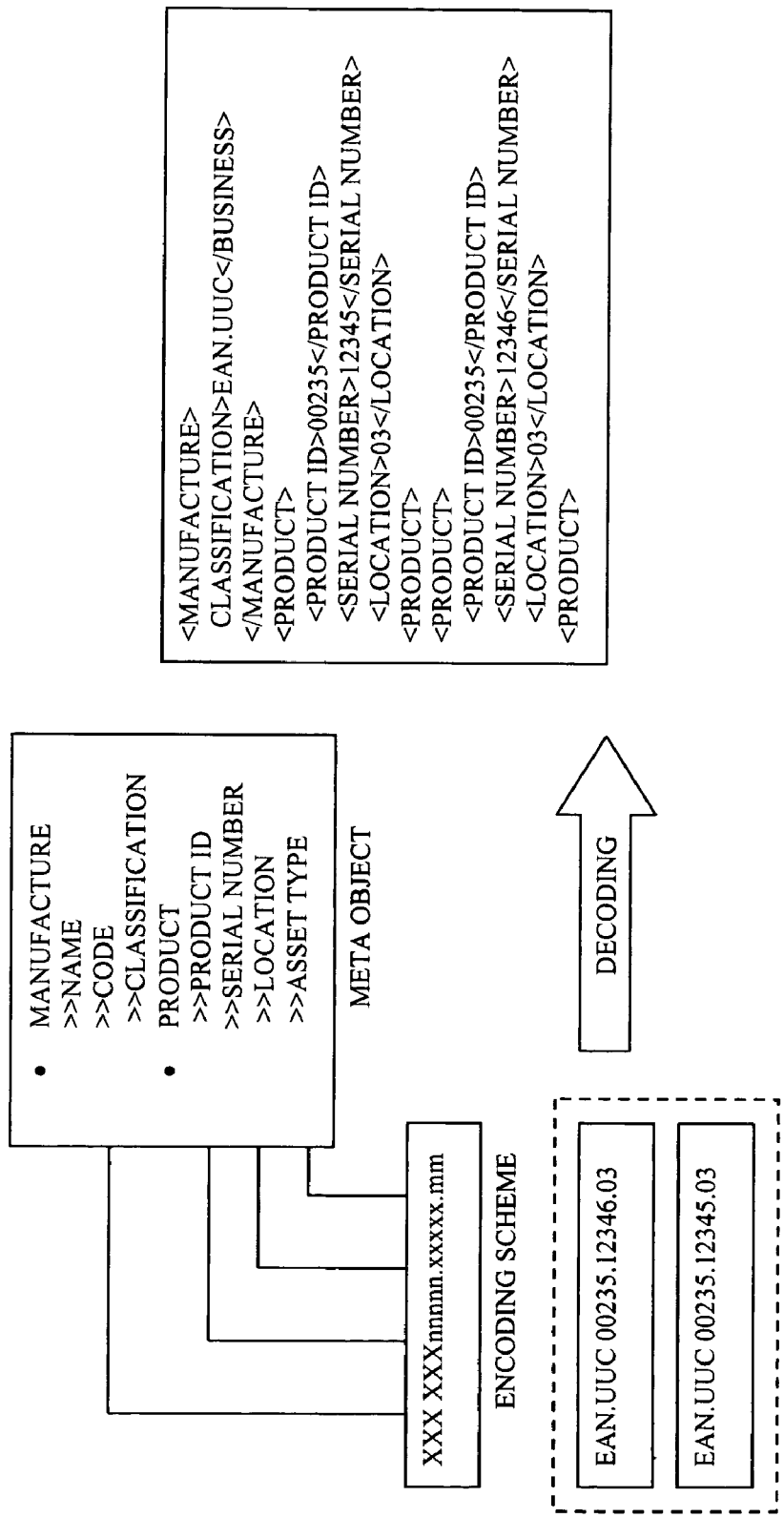
FIG. 6, shows an example of decoding an RFID scan data message, enriching it with reference data, and reformatting it into an XML data record for transmission to other !*–1 business systems.

The Context Resolution Engine performs a message decoding process as shown in FIG. 6. In general, messages received from the control nodes contain only the raw data obtained from the scan of the RFID tag (typically product type code and item serial number), plus the location ID and date-time of the scan. This information requires decoding from the received message format, plus optional further supplementation or enrichment by lookups to a) static reference data (e.g., manufacturer and product information), and b) business information such as purchase orders, invoices, repair orders and the like. FIG. 6 shows a scan message that is decoded and translated into an XML message for use by other data systems. Such a decoded message can also include other business information pertaining to the scanned item.

At this time the server may also determine the direction of motion of the item, whether it has arrived-at or departed-from a given location. If the item is new, with never before seen identification data, a new item record may be appended to the tracking database. Then under the item record a movement detail record may be appended, to record the latest tagged asset movement event.

Figure 7:
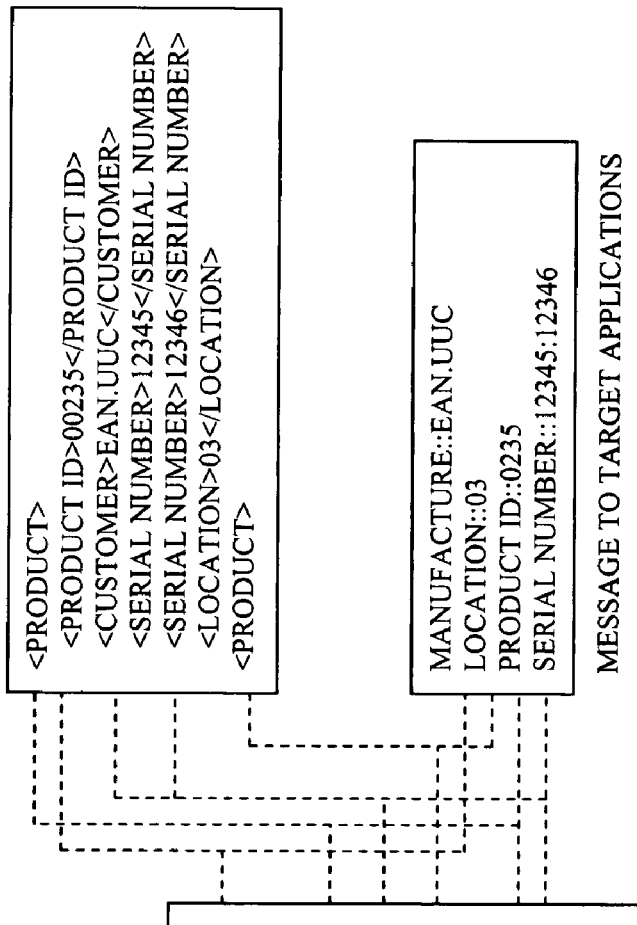
FIG. 7 shows an example of generating an event message for transmission to a related business system, such as an ERP system.

The Event Management Engine (as shown in FIG. 4) performs message generation and sending to external applications as shown in FIG. 7. According to pre-defined rules for item tracking events, if (for example) a tagged item arrives or departs from the client's inventory location, a message can be formatted and sent to the client's ERP (enterprise resource planning) system informing it of such arrival or departure, and instructing it to increment or decrement the inventory count for that item type.

The Discovery Services Server (as shown in FIG. 4) allows end users to perform tracking inquiries and run reports. A user who wishes to determine the current location of a specific tagged item can run an inquiry to search for that item in the database, and retrieve its most recent movement detail records. A user query can also take the form of a request for an alert. For example, a user could request that if the specific tagged item does not appear at a given location by a predefined time, to send them an alert (such as an e-mail or dialing their pager) to notify them of its non-arrival at the specified time.

Also as shown in FIG. 4. an administrative workstation is provided to allow system administrators to maintain and update: a) data field validation rules, b) static reference data on manufacturers, products, locations, and the like, c) message rules and formats for transmission of item movement data to other business applications (such as ERP, accounting, or EDI), d) the list of authorized end users including their user IDs, password assignments and changes, and system authorizations, and e) a set of reports or inquiries to be performed by the tracking server (possibly requesting information from other systems) to identify the current context of the tagged item, such as its purchase order, repair order, and requesting end user.

The tagged item movement data management system (TIMDMS) described herein is not limited to the foregoing, but can also manage all information obtainable from a scan of the item's tag, which may include additional data fields such as temperature, humidity, pH, manufacturing date, expiration date, warranty date, and others depending on the application or tag type.

Furthermore the system can retrieve and utilize any kind of static reference data and/or business context information, either from its local RFID tracking database, or from other inter-connected business computer systems. Such data can be used to enrich the item level tracking data records. The enriched data records may then be stored in the RFID Tracking Database, and accessed via in an information search and retrieval system to fulfill end user tracking inquiries, or to compile pre-determined or ad hoc reports covering a single item, purchase order, repair order, product batch, or other unit of business information.

Figure 8:
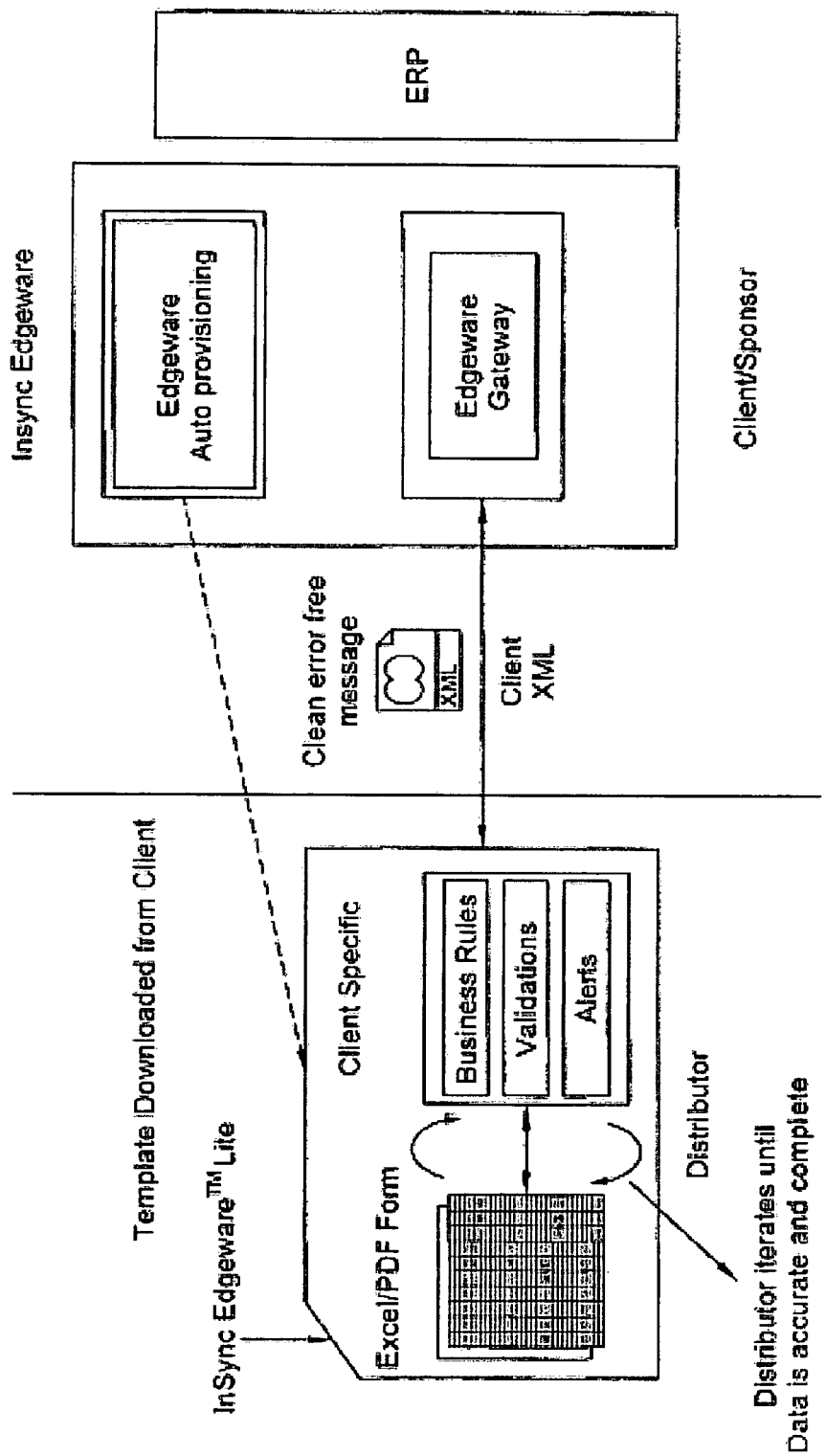
FIG. 8 shows an example of the use of the remote administration tool by a distributor or supplier to update its reference data on the client's RFID Tracking Server.

FIG. 8 shows a schematic diagram of information processing by a client ("Juniper") and a supplier ("distributor"). To more efficiently maintain the business rules, reference data, field validations and alerts pertaining to the products supplied to the client by that particular distributor, the client provides a version of an administrative workstation including a data editing tool to the distributor. The distributor periodically updates the reference data and other information pertaining to the tracking of its products by the client's RFID Tracking Server. This data is then uploaded to the client's RFID Tracking Server for use in the context resolution, enrichment, event management, and user inquiry processes.

Figure 9:
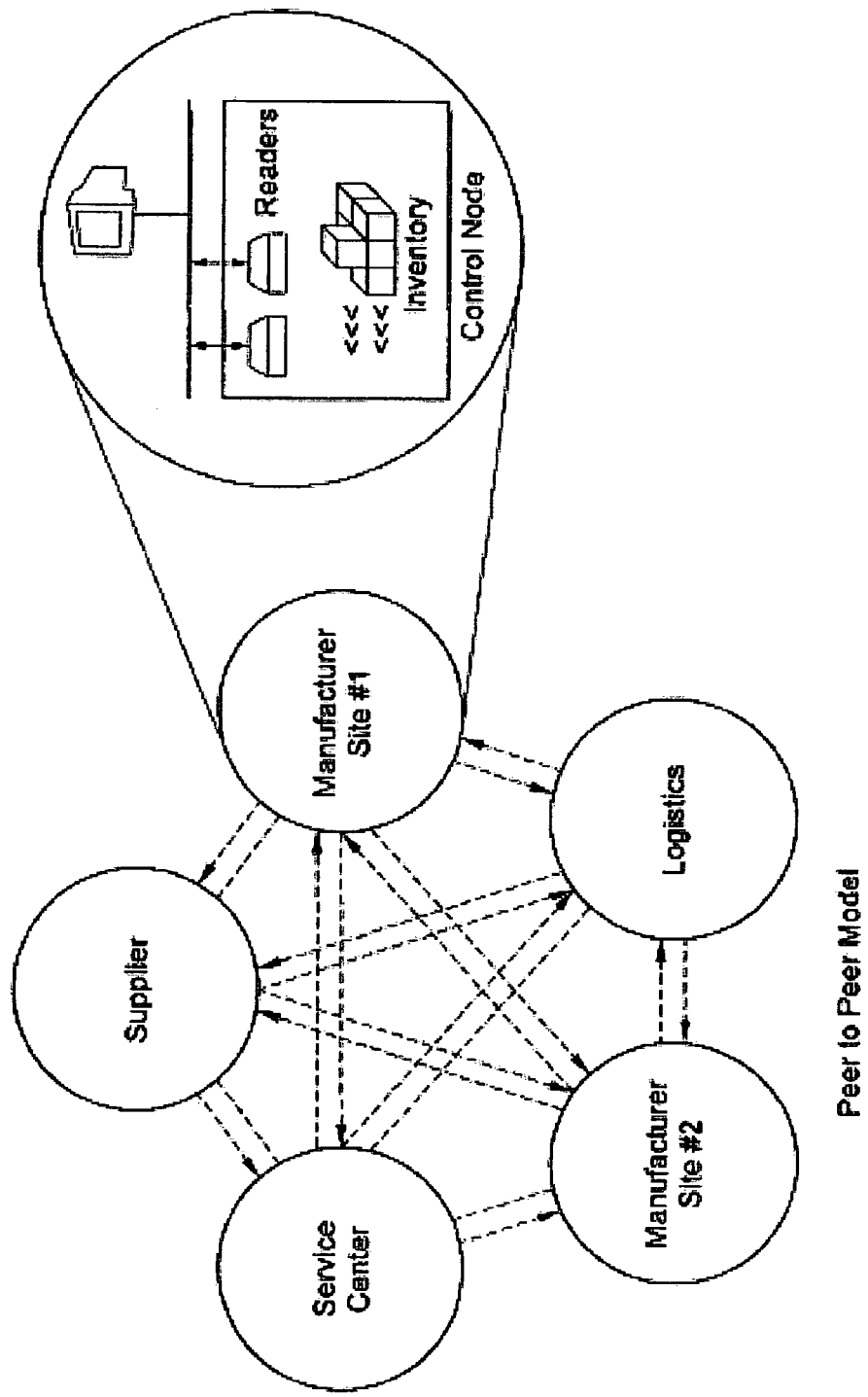
FIG. 9 shows an example of peer-to-peer distribution of functions, including control nodes at multiple trading partner sites in a supply chain.

FIG. 9 shows a schematic diagram of a peer-to-peer model whereby the functions of the herein described system can be distributed to multiple trading partners in a supply chain. Each participant: a) implements one or more control nodes for reading RFID tags and transmitting information to an RFID Tracking Server, b) utilizes an administrative data update program to periodically update their reference data and other information as described in respect to FIG. 8 and c) performs inquiries and runs reports (not shown) by accessing the discovery services module of the RFID Tracking Server. In this manner all participants can have their RFID tagged items automatically scanned by the control nodes, keep their reference data current, and benefit from the tracking and inquiry features of the RFID Tracking Server.

Figure 10:
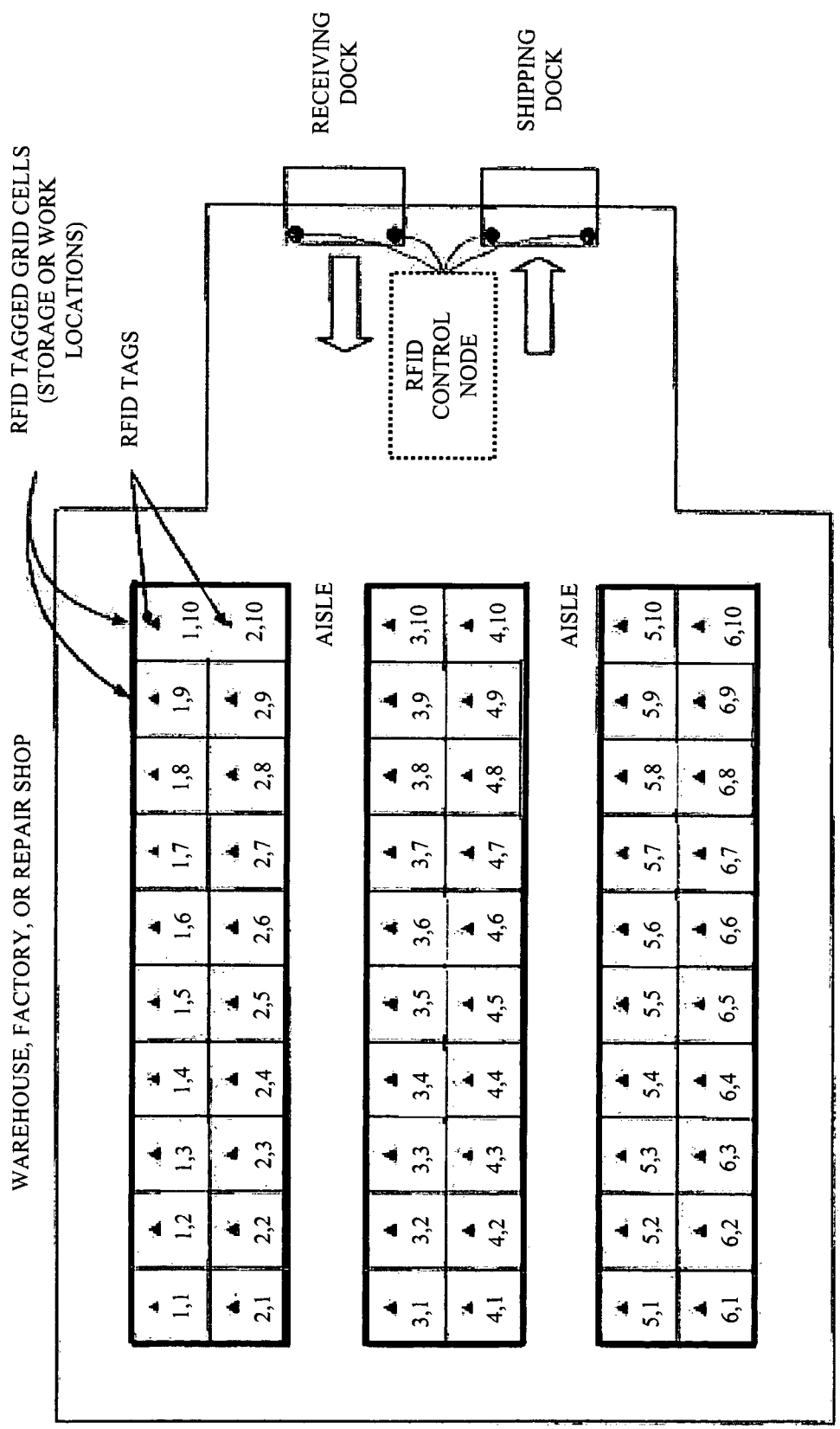
FIG. 10 shows an overhead schematic representation of a warehouse with RFID) tagged grid cells. Each cell has an ID number and a unique RFID tag.

Referring now to FIG. 10, although the control nodes can automatically sense and relay information regarding the location of a tracked item, there is also a need to track and verify its location in between control nodes. This can be accomplished by creating a grid of pre-defined cells, which can be of any size or shape, to subdivide the floor area at a given location. A unique RFID tag is installed in or near each grid cell. This allows more fine grained location data to be generated, by directing the warehouse workers (or automated equipment) to perform a double scan using (e.g.) a hand-held RFID reader wand. When the worker scans the RFID tag on the item he or she will also scan the cell-tag. As a result the item-tag and cell-tag data are transmitted to the RFID server close together in time, which causes the server to associate the item-tag with the cell location, and store the cell ID in the database as indicating the item's current location.

FIG. 10 depicts a warehouse that has been divided into an arbitrary number of cells using the grid concept. Each grid cell has been assigned a location ID, in this case an ordered pair indicating a row ID and column ID. However this is arbitrary and any unique cell numbering scheme could be used. If the warehouse or other area had multiple floors, it would probably be helpful to include the floor number in the cell ID.

Thus in addition to the control nodes as previously discussed, the system provides a technique to further identify a storage location for a tracked item, by tagging each cell of a grid layout pattern, and then double scanning (that is, scanning both the item tag and the location tag) when the item is placed into the location. A pre-defined map, list, or other representation of the grid cells, their physical locations, and their unique RFID tag data is entered into the RFID Tracking Server and maintained in case of changes. This pre-defined list of grid cells can then be queried to determine the location of a scanned tagged item where its cell was contemporaneously scanned.

Figure 11:
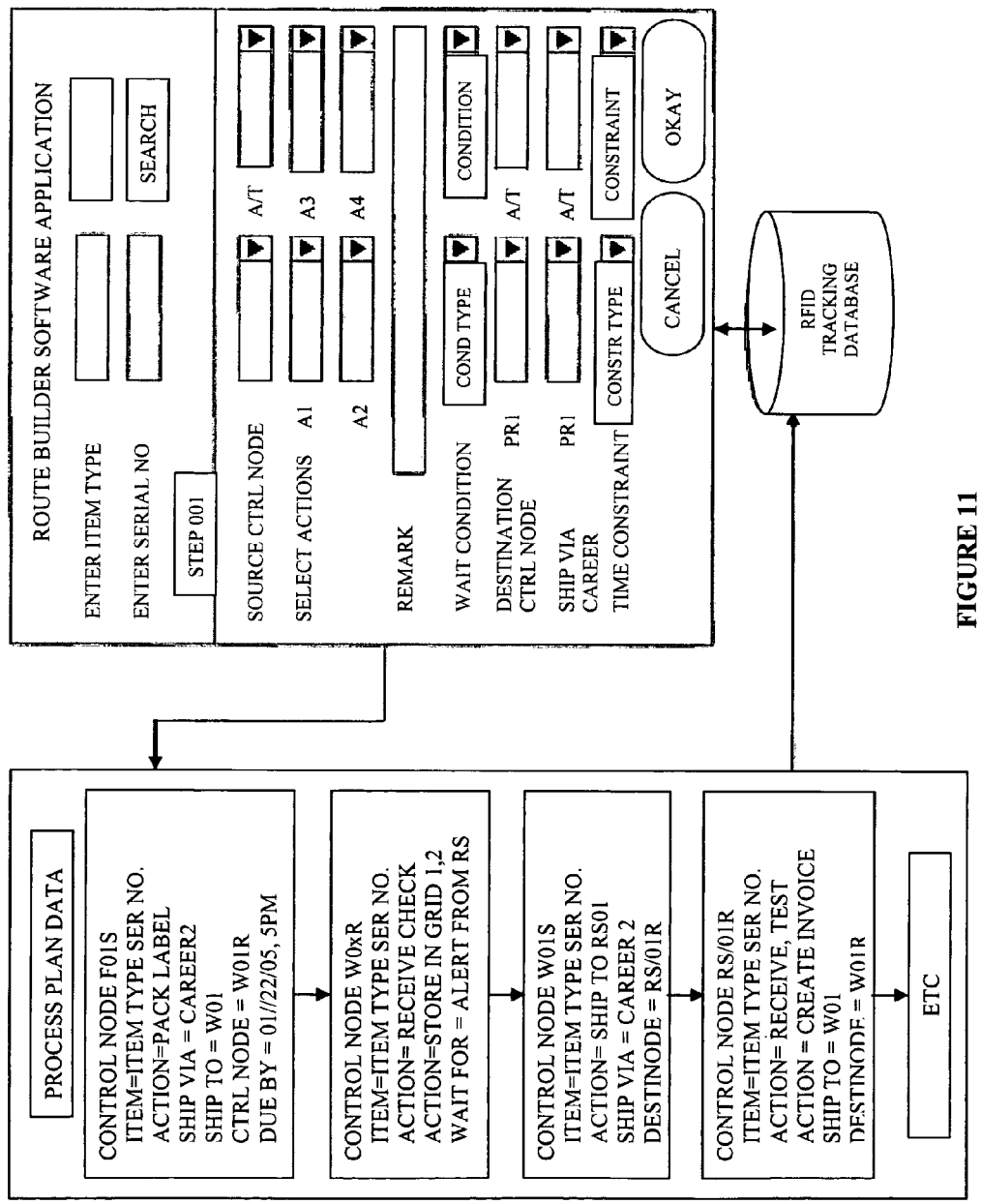
FIG. 11 shows a data representation and user application for a node-based route model, in which the unit of analysis is the control node.

Referring now to FIG. 11, in addition to determining the location and direction of travel of a scanned RFID tagged item, it is also desirable to create a pre-defined route and process plan, which may contain alternatives, action steps, constraints, and conditions, to direct, control, and track the progress of a particular item in transit.

For example, in a given factory there may be a series of high value machine tools that need to be sent out for maintenance and repairs. Not only are these machine tools expensive, but they are critical to the factory operations, so every hour of downtime for the tool has an associated cost.

Figure 12:
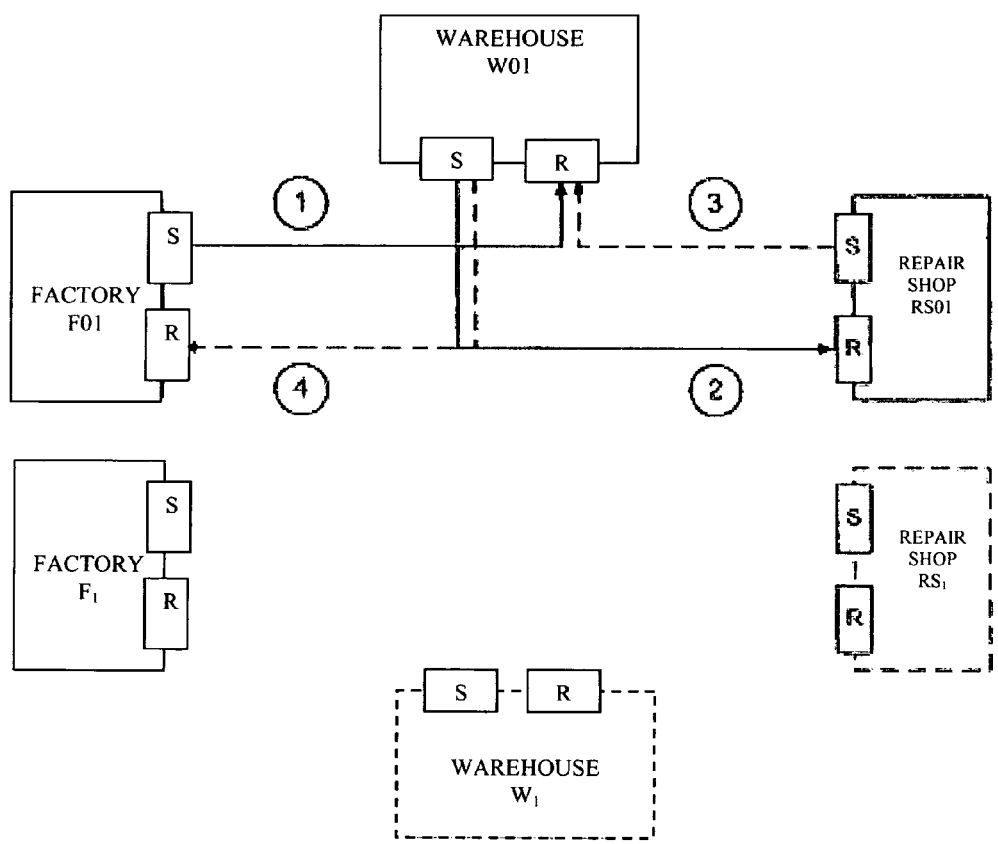
FIG. 12 shows a schematic diagram of a segment-based route model, in which the unit of analysis is the route segment.

Referring now to FIG. 12, when a tool needs maintenance it will normally be shipped (in Segment 001) from the said factory via the shipping controls node (F01S) to an intermediate warehouse receiving dock (W01R), where it is held until the repair shop is ready for it, whereupon (in Segment 002) it leaves via the warehouse shipping dock (W01S) and is sent to the repair shop receiving dock (RS01R). (While inside the warehouse it may be further tracked via the grid cell mechanism as discussed in Section 5.1. but that is omitted here.)

FIG. 11 shows a data representation and user application for a node-based route model, in which the unit of analysis is the control node. The objective is to define the Process Plan Data, which will be used to guide, control, and monitor the actual physical process to be carried out. In a node-based embodiment, as shown in FIG. 11, the route builder application accepts user input from a Route Builder Software Application screen, which upon acceptance by the user is stored in the RFID Tracking Database.

The Route Builder Software Application can prompt the user to supply a cluster of data relating to the activities to be performed at or near each control node. In one embodiment the route data are encoded using a version of Business Process Execution Language for Web Services (BPEL4WS), an XML (extended markup language) variant that can be used to define business processes or tasks to be executed, by pre-defined actors or entities, subject to various pre-defined conditions, or constraints.

As shown in the example in FIG. 11, the user is prompted to enter or search for the item type and serial number, and then for each process plan step to input a source control node and potentially an alternate control node, where the action step will originate, plus a list of actions such as packing and labeling, plus a wait condition if any (such as wait until the repair shop notifies the RFID tracking system that it is ready to accept the item to be repaired), plus a destination control node and potentially an alternate destination control node, designate a primary and alternate carrier, and set any time constraint, such as a due date of deadline.

As shown in FIG. 12 there can potentially be multiple factories $F_i$, multiple warehouses $W_j$, and multiple repair shops $RS_k$, which may be close or equivalent substitutes for one another. Hence if one location or carrier is not available or is busy, the alternative means specified can be used.

By providing a pre-defined route specification, including requested business processes and constraints, the RFID tracking system can generate a) "expect to receive" alerts for each location, so that it knows if an item is coming, and b) alerts to the user to notify them that the plan is being followed as specified or to warn of any deviations or delays. The system can also display a map or other graphical representation of the planned route and actions, which the user can view to monitor the progress of a given process plan.

In an alternative embodiment, the route specification can be made segment-based rather than node-based. Then BPEL4WS or another regular specification language can be used to predefine the segments and related activities.

For example—

| | |
|---|---|
| Fx = { F1 or F2 ... F10 }; | // factory |
| Wx = { W1 or W2 }; | // warehouse |
| LPx = { LP1 or LP2 or LP3 }; | // logistics provider, shipping company |
| SCx = { SC1 or SC2 or SC3 }; | // service center |

FxR=factory X receiving
FxS=factory X shipping
Step1 (
FxS→WyR;
where x=1 andy=1 or 2;
via LPz;
where z=1 or 2;}
Step2 {
WyS→SCNR;
where y=1 or 2;
and n=1 or 3;
via LPm;
where m=2 or 3;}

A software application similar to the one depicted in FIG. 11 would be used to elicit the user to input the data for the process plan, except that rather than focusing on a given node, the data representation would focus on a route segment. These representations are expected to be roughly equivalent, and in fact could be mixed to contain both node-centric and route-centric information, even if this results in some redundancy.

As before, by pre-defining a process plan for the movement of a high-value RFID tagged item, such as an expensive and critical machine tool going out for repairs, the system can generate pre-notifications, instructions, notifications of the completion of non-completion of a given step at the time expected, and permit the generation of a "visibility" map that permits the user to visualize the route (and any alternates) and progress along the route.

All systems and processes disclosed herein are intended to be implemented using software or firmware running on networked electronic and computer equipment. Such computers may be personal computers or server computers, and will generally possess a general or special purpose central processing unit (CPU) chip; random access memory (RAM); hard disk data storage; removable data storage such as CD, DVD, and the like; keyboard and or mouse user input devices, and display devices such as personal computer video display monitors.

Such computing devices and subsystems are generally interconnected using electronic communication channels, including but not limited to wire cables, digital data networks; cable feeds, dial-up access networks, and wireless networks. All processes and methods described herein will be generally encoded using a computer programming language, such as Java or C++, copied and installed onto the disk storage or firmware of the respective devices and systems, loaded into working RAM memory, and executed to provide the steps, processes, and functions disclosed herein. All information and data will be encoded in pre-determined formats or record layouts, including message formats for electronic or wireless (radio) transmission, database records for storage of information in data storage and retrieval systems, and report output formats for display of information to users and production and printing of pre-defined or ad hoc reports.

A computer program product will be produced consisting of the ensemble of precompiled computer programs and associated un-initialized or partially initialized data tables to perform the method and steps of the invention, encoded onto a removable storage medium, such as a CD ROM disk, for shipment to and installation by Licensees of the technology, who may also in some cases execute the programs from the CD ROM.

Figure 13:
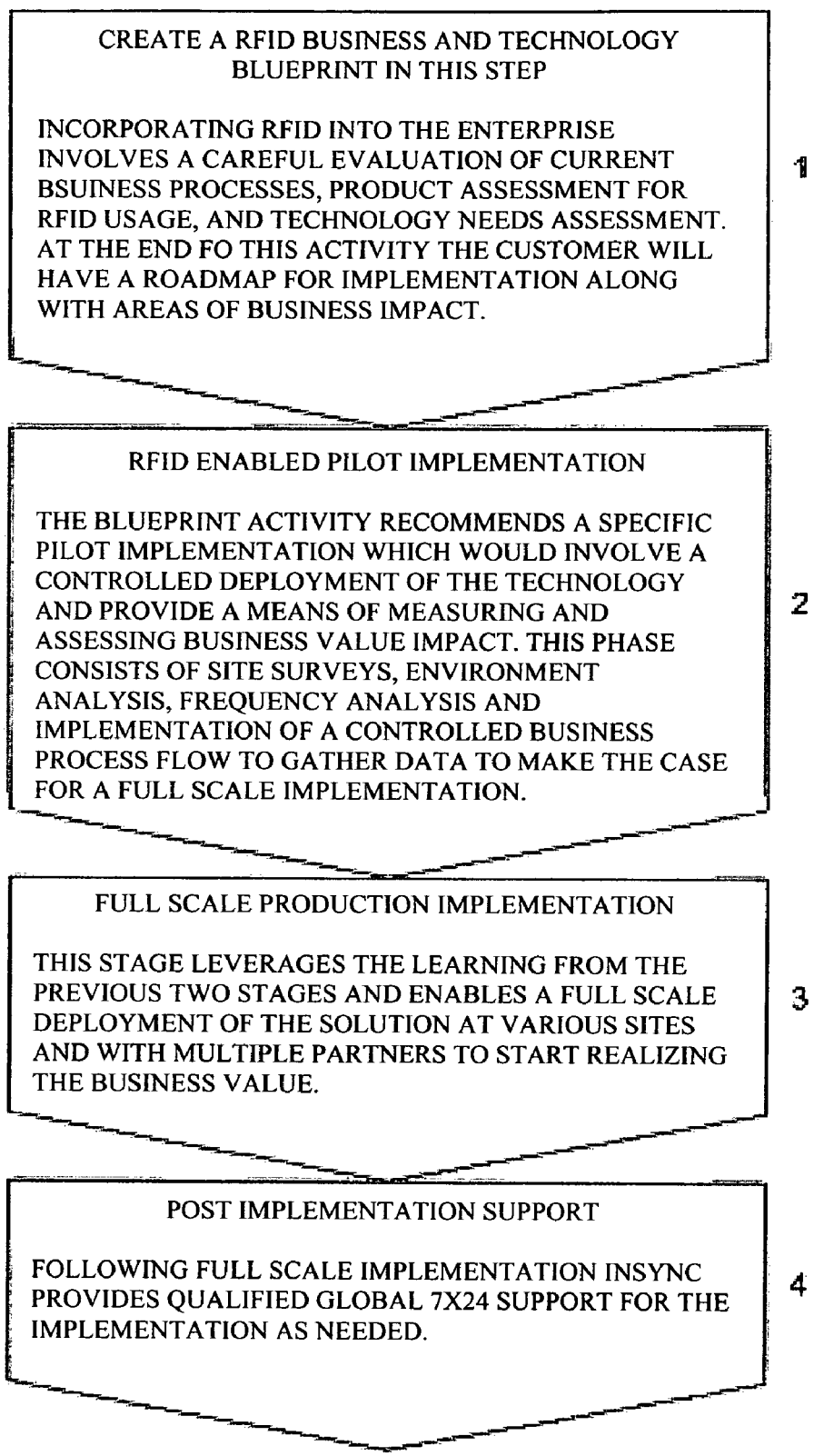
FIG. 13 is a flow diagram of the creation and implementation of an RFID enabled business.

FIG. 13 provides a flow chart of the steps which may be taken during the creation and implementation of an RFID based tracking business.

The first step can be considered to be the creation of an RFID Business and technology blueprint. In step 1, the task of incorporating RFID sensors into an enterprise involves a careful evaluation of the current business processes, a product assessment for RFID usage and other technology assessments.

The second step can be considered to be the enablement of a pilot implementation. In step 2, the blueprint activity may recommend a specific pilot implementation which would involve a controlled deployment of the technology and provide a means of measuring and assessing business value impact. This phase consists of site surveys, environmental analysis, frequency analysis, and implementation of a controlled business process flow to gather data to make the case for a full scale implementation.

The third step can be considered to be the full scale production implementation. Step 3 leverages the information learned from the previous two stages and enables a full scale deployment of the derived solution at various sites and with multiple partners to start realizing the business value of the improvements made available by the combination of the RFID sensors for tracking items and the software for managing the process flow.

The fourth step may be considered to be the post full scale implementation support. In step 4, following full scale implementation, qualified global 7 by 24 support for the implementation as needed is provided as needed.

Figure 14:
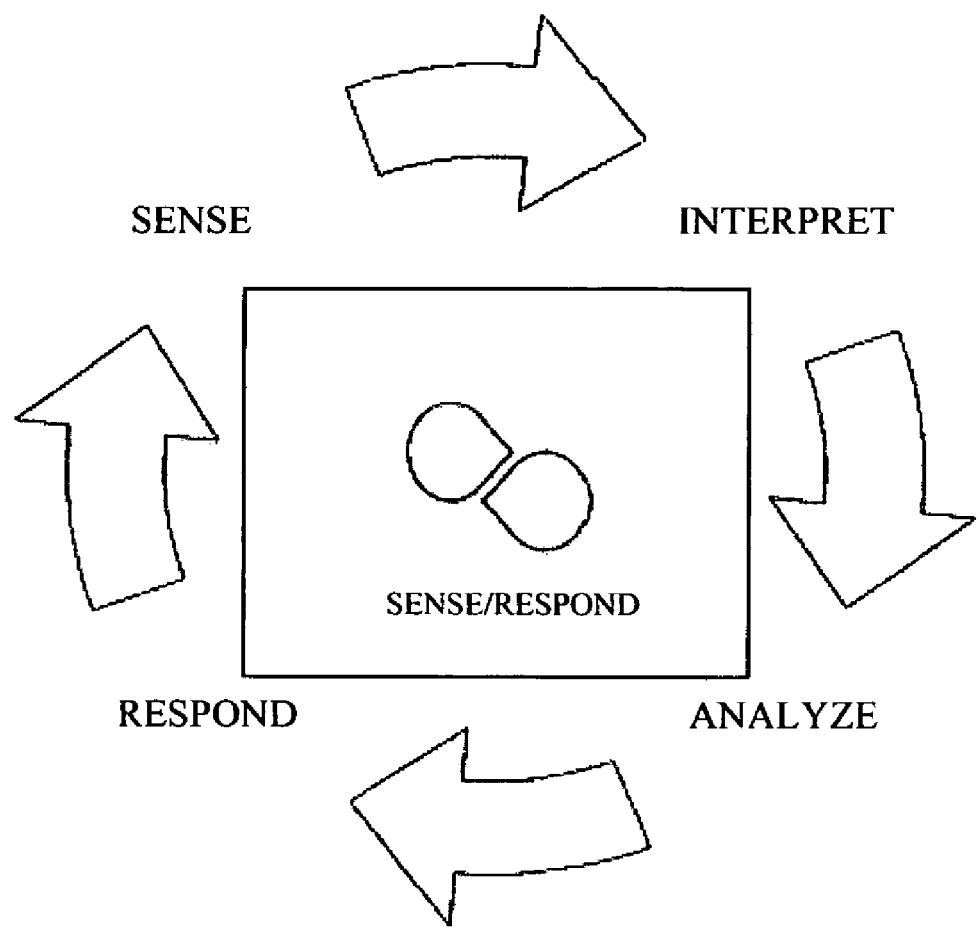
FIG. 14 illustrates the sense and respond aspects of the methods and techniques described herein.

Referring now to FIG. 14, the synchronized workflow software provides sense and respond solutions to intelligently combine RFID and other presence aware sensors to
  automate traditional manual repetitive activities.
  sense, interpret, analyze and respond to changing business processes instantly across the global supply chain.

Figure 15:
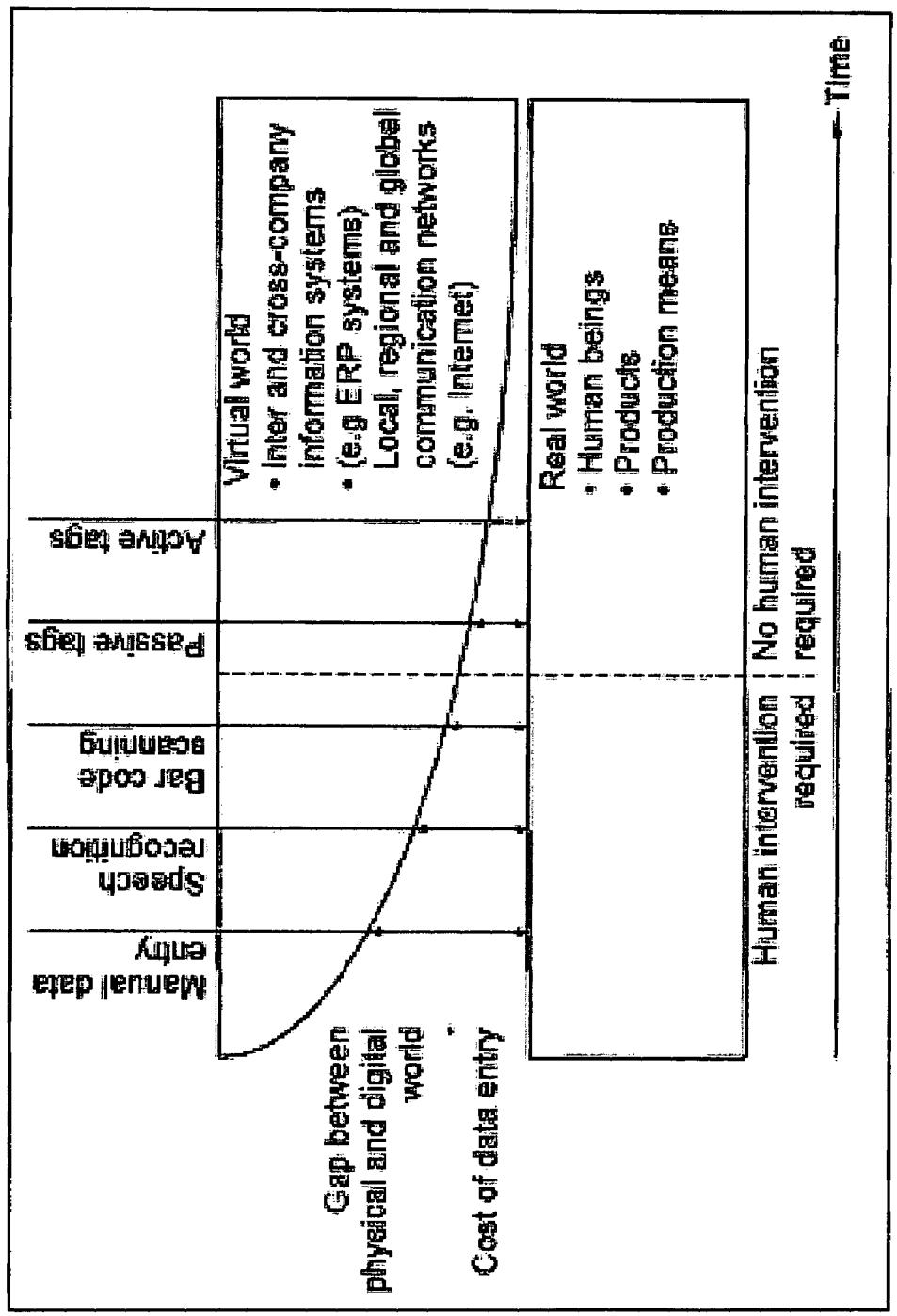
FIG. 15 is a graphical representation of the gap, related to the cost of data entry, between the real world of manufacturing and the virtual world that can be simulated and controlled, for example, with conventional ERP systems.

Referring now to FIG. 15, the gap between the real world of manufacturing and the virtual world of conventional software systems is the cost of data entry.

The business problem is to develop effective systems for locating, identifying, tracking, and tracing assets which don't require significant human involvement, such as the synchronized workflow software described herein to increased automation and reduced need for hands-on tracking and tracing.

Figure 16:
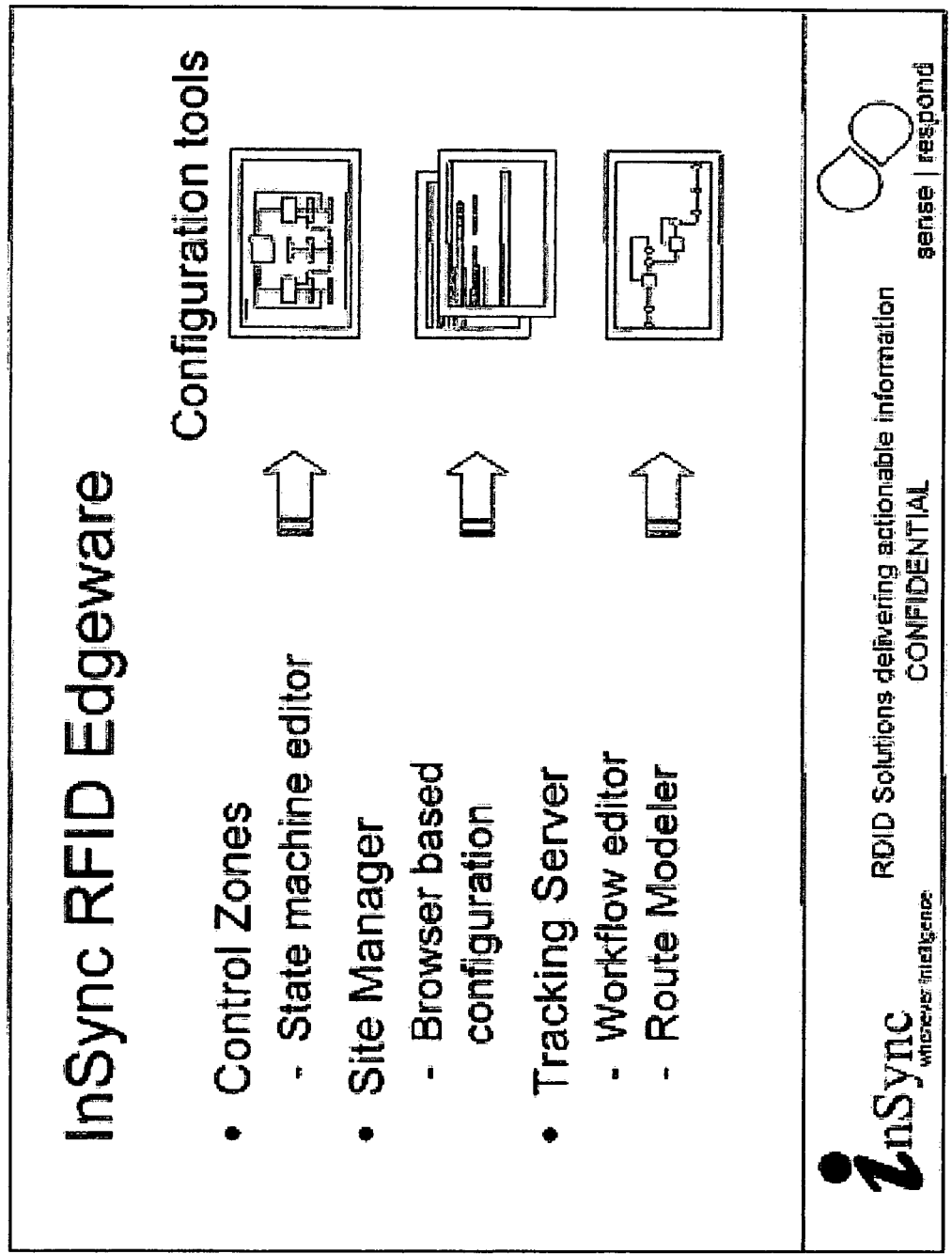
FIG. 16 is a power-point slide of a particular implementation of synchronized workflow software including control zones, site management and a tracking server.

These techniques are particularly useful for customers with at least some of the following characteristics:
  Capital intensive assets—0,000#% relation to RFID tag cost
  Large (#) and expensive ($/hour) technician workforce
  Roaming requirements—assets not grouped closely
  Asset identification requirements
  Down time either dangerous/illegal or expensive
  Presently using paper processes for mobile workforce
  Poor data quality
  RFID Software Modules provide
  Control Zone Software
    Manages RFID and other Auto-Id devices (barcodes, handhelds, label Printers PLCs, ... )
    Used for Mandate Compliance
    Easy to configure, simple to use
    Can be embedded in the RFID device
  RFID Enterprise Tracking Server
    Gathers data from control zones
    Integrates with ERP/WMS and other systems
    Send ebusiness messages (EDI/FTP, ... ) to other partners
    Can be deployed standalone or in a distributed configuration
    Configuration driven—browser based
    Can be used to build a variety of RFID enabled applications Referring now to FIG. 16, the configuration tools for the control zones, site manager and tracking server are illustrated.

Figure 17:
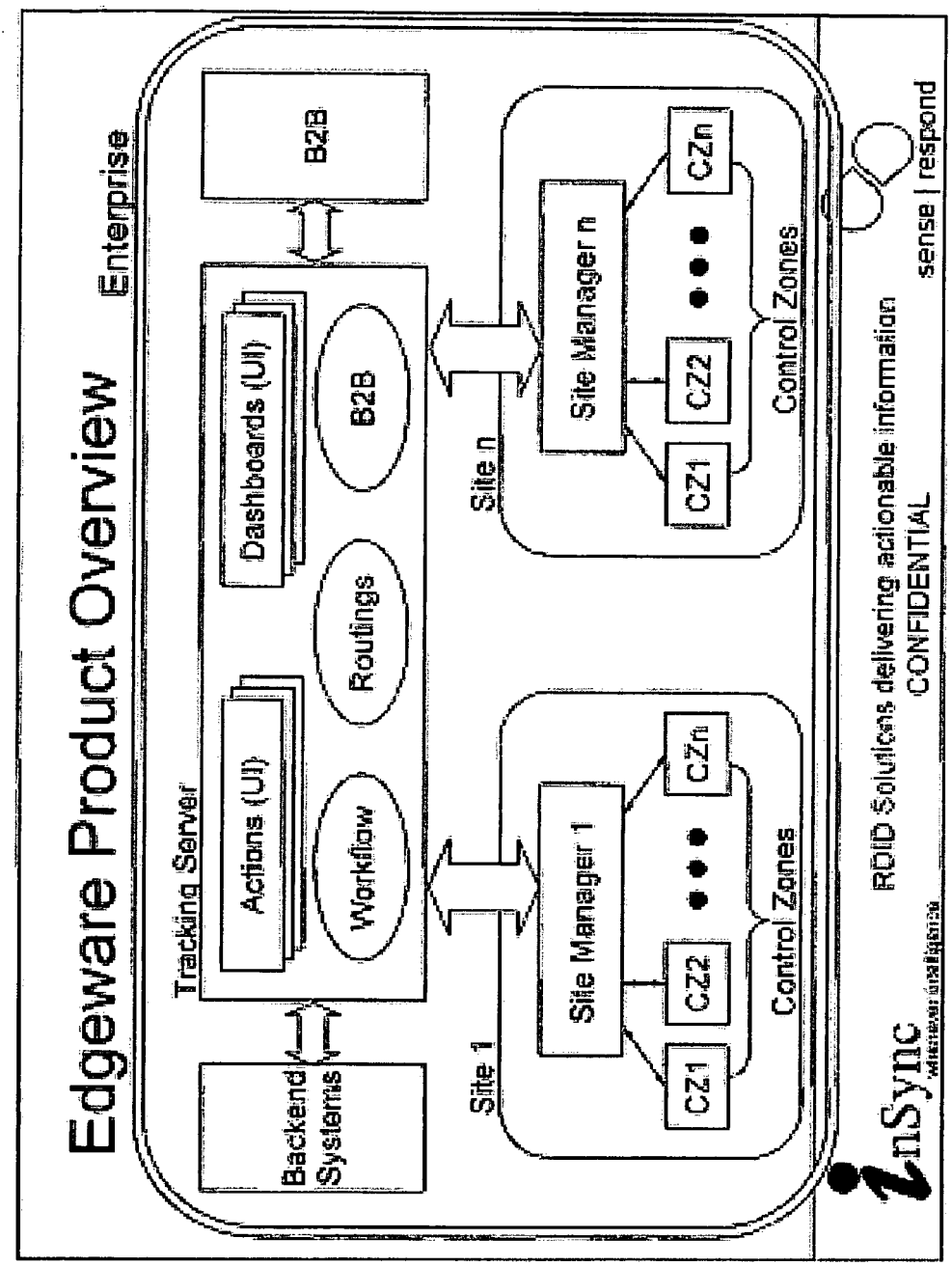
FIG. 17 is an overview of one implementation of the software product of FIG. 16.

Referring now to FIG. 17, a product overview is shown.

Figure 18:
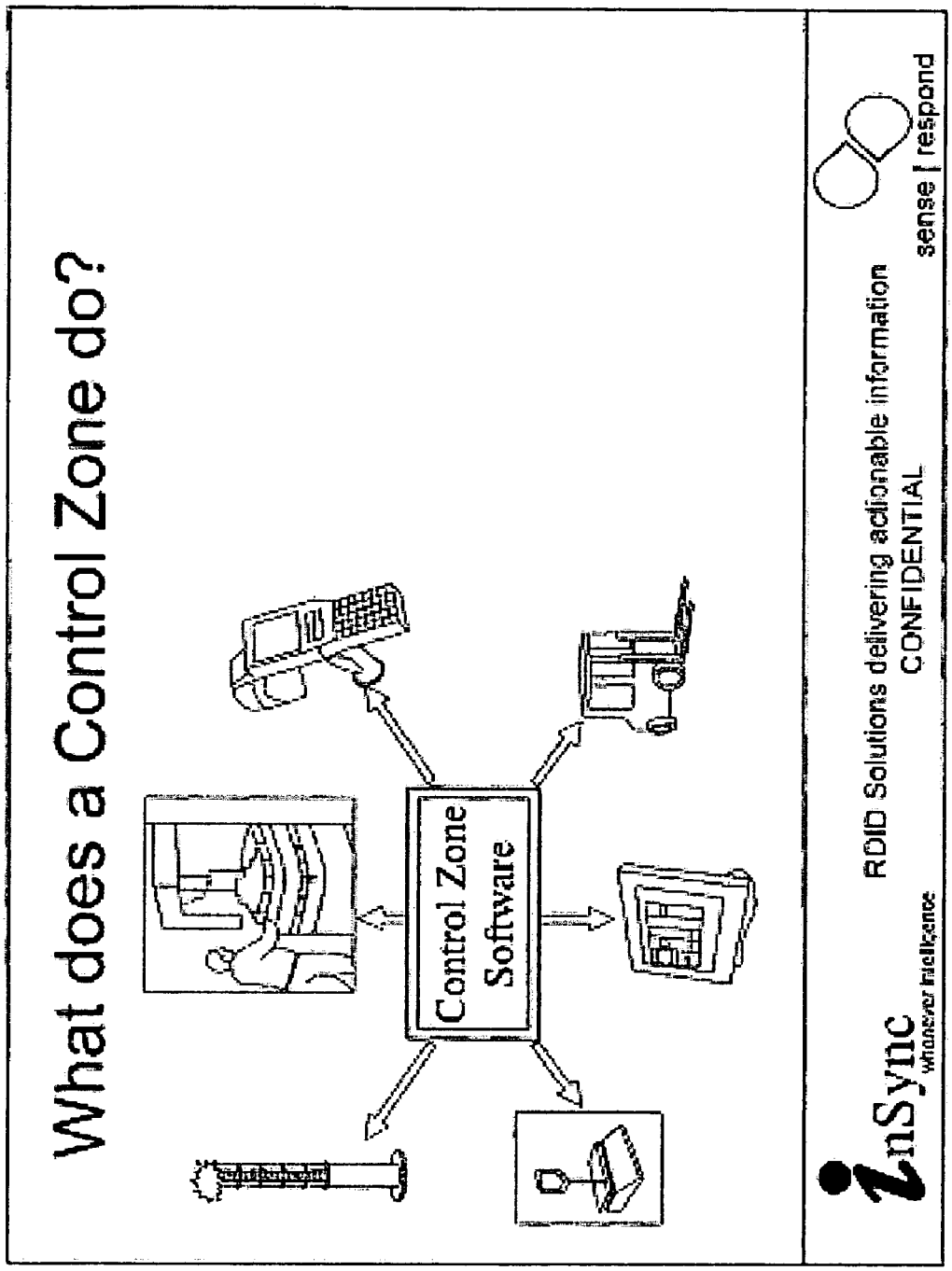
FIG. 18 is a power-point slide of control zone software.

Referring now to FIG. 18, control zones manage devices and sensors at a specific location and
  are used to implement local workflows
  control in and out movements of assets
  tag and ship products for delivery to customers
  coordinated activity between devices in the control zone.

The synchronized workflow software described herein features control zones which become an intelligent portal that combines several devices such as RFID controllers, PLCs, Printers, Barcodes, Handhelds, Electric Eyes, Sensors and the like, within based at a
  shipping dock
  receiving dock
  tag and print station
  handheld reader Control zones are used to implement local device specific workflows controlling in and out movement of assets and permitting a controlled tag and ship function. They may implement Savant and ALE functionality and utilize a configurable state machine to coordinate activity between devices in a control zone.
  Site manager
  manages multiple control zones
  includes a configuration tool
    for device configuration
    subscription and notification of events
    user access and password management.
  One site manage can configure multiple control zones
  Browser based interface
  tag management
  reader management
  persistent local reads
  control zone and device monitoring
  site manager can be deployed standalone or on a machine that is running the control zone.

Tracking Server
  is a repository of events from site managers, business partners and enterprise systems
  provides enterprise level orchestration (work flow) engine for implementing business process, rules, etc.
  permits defining and tracking product routes for inter-enterprise product movement and tracking
    acts as integration interface to backend systems
    provides a portal builder to build custom user interfaces for
      track and trace information
      inventory tracking
      user actions via browser or handheld scanner
      reconciliation screens
      proof of shipment
      proof of delivery
  Context server provides context data to individual site managers, for example, for shipment identifications for printing RFID labels at a control zone.
  Notifies business partners or other systems of Events, e.g. ASNs.
  The value chain model provides
  two types of nodes or locations
    site manager nodes using RFID sensor events
    Business partner nodes using B2B
  one site manager can have multiple sub-routes or be used multiple times in a value chain model.

Figure 19:
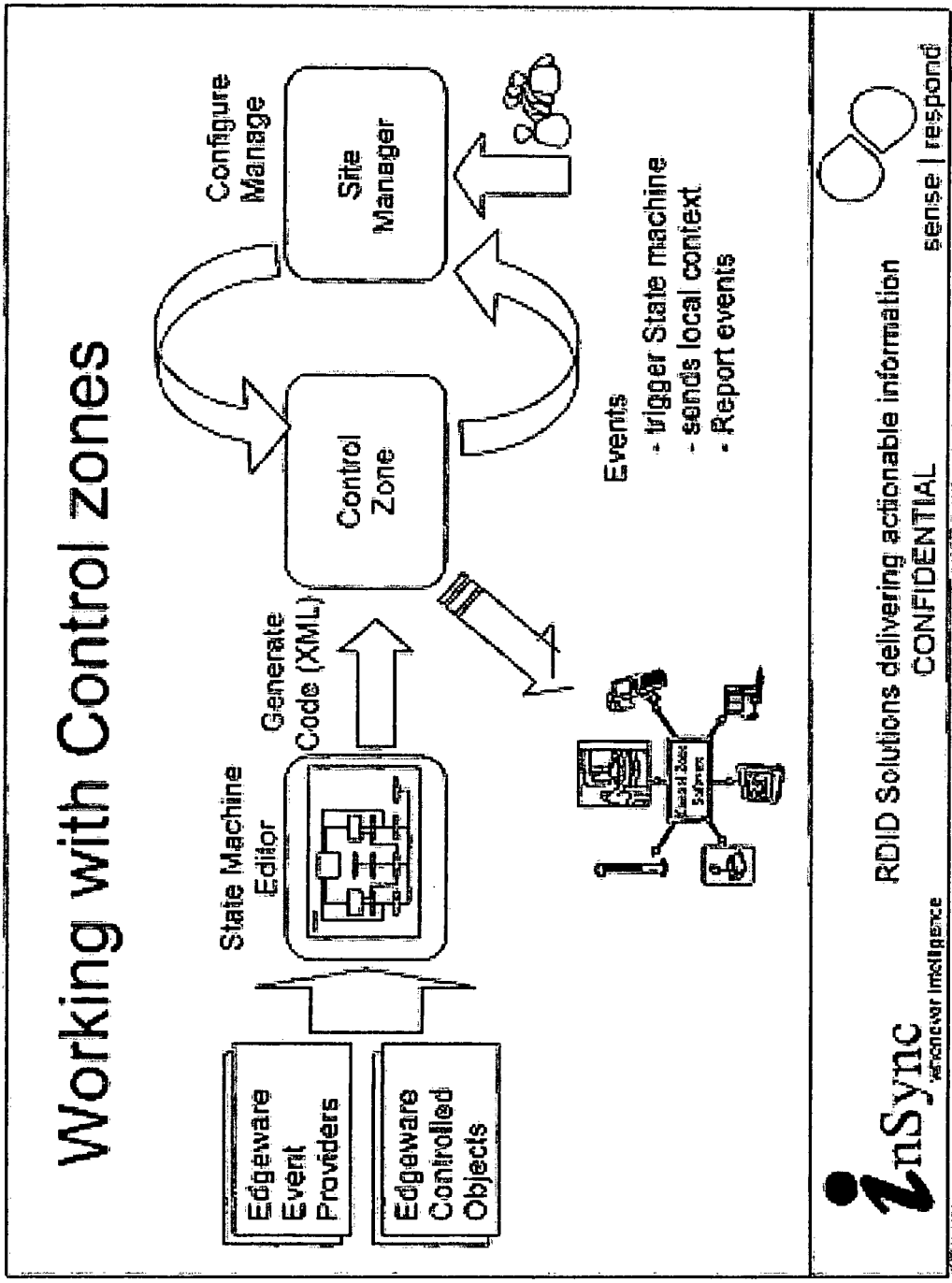
FIG. 19 provides additional details of the control zone software of FIG. 18.

Referring now to FIG. 19, working with control zones includes working with event providers and controlled objects.

Figure 20:
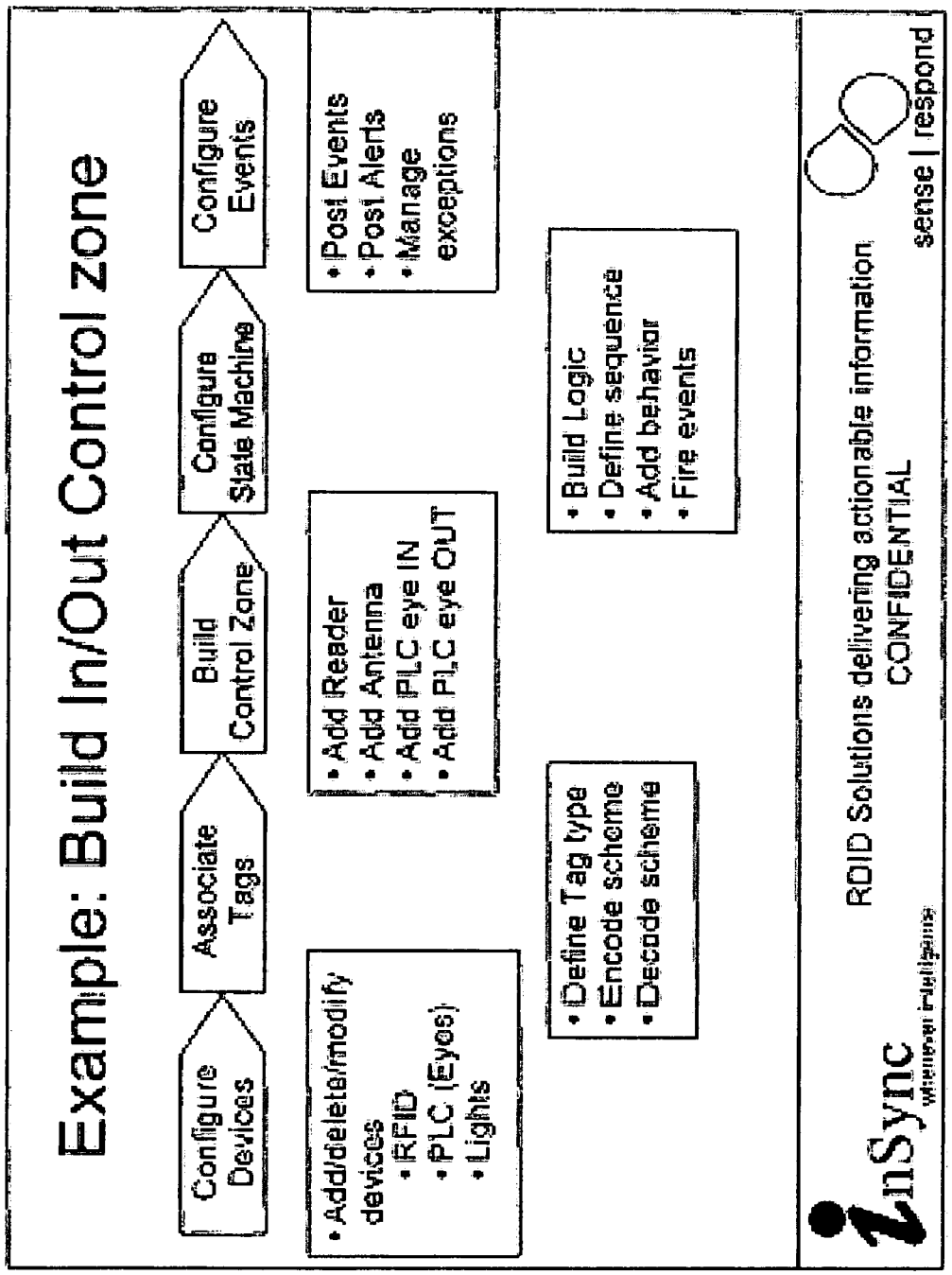
FIG. 20 provides an example of the build for the control zone software of FIGS. 18 and 19.

Referring now to FIG. 20, a technique for build in/out zone control is shown.

Figure 21:
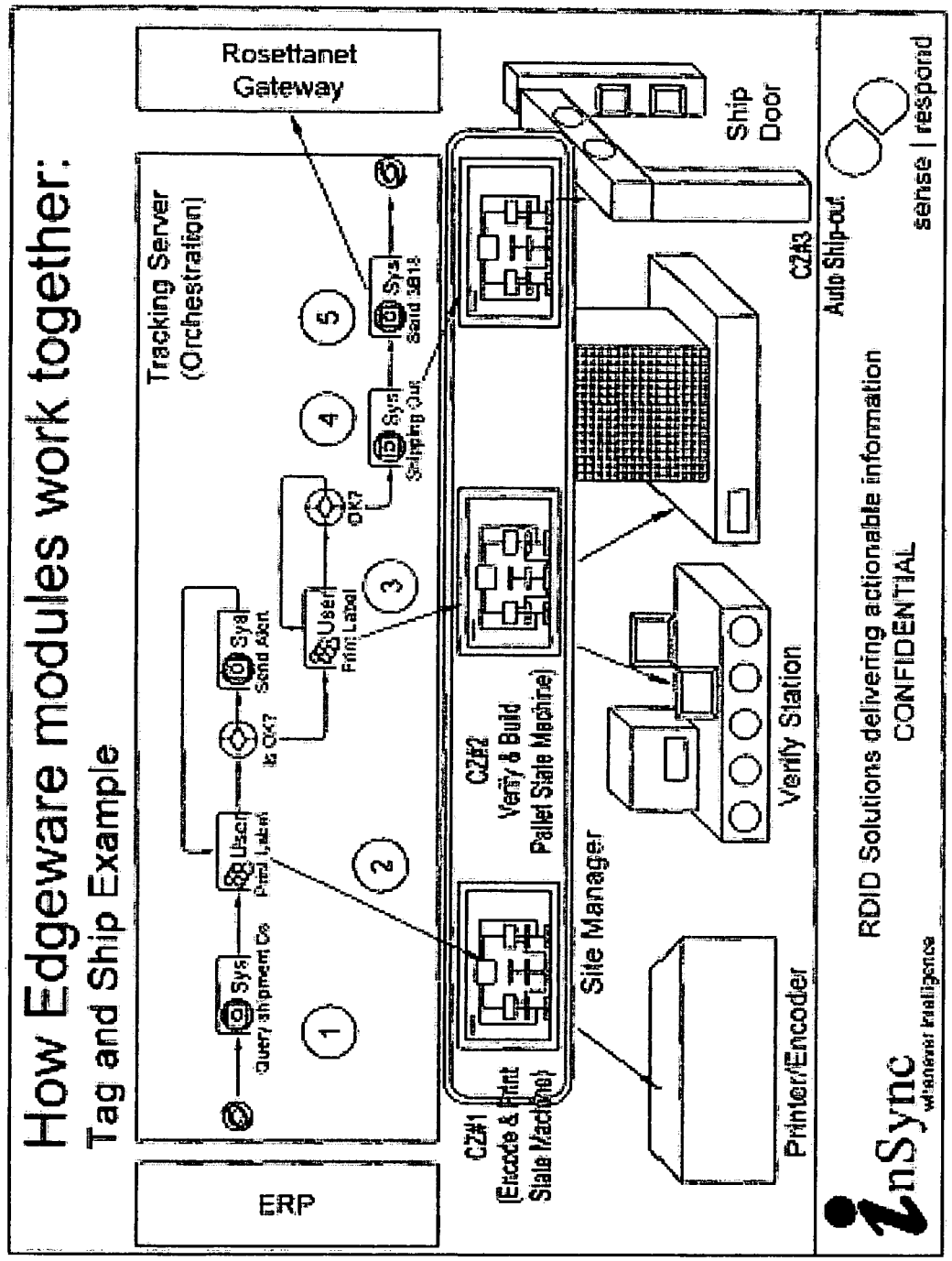
FIG. 21 provides an illustration of how the software modules work together.

Referring now to FIG. 21, a tag and ship example of how the software modules work together is shown.

Figure 22:
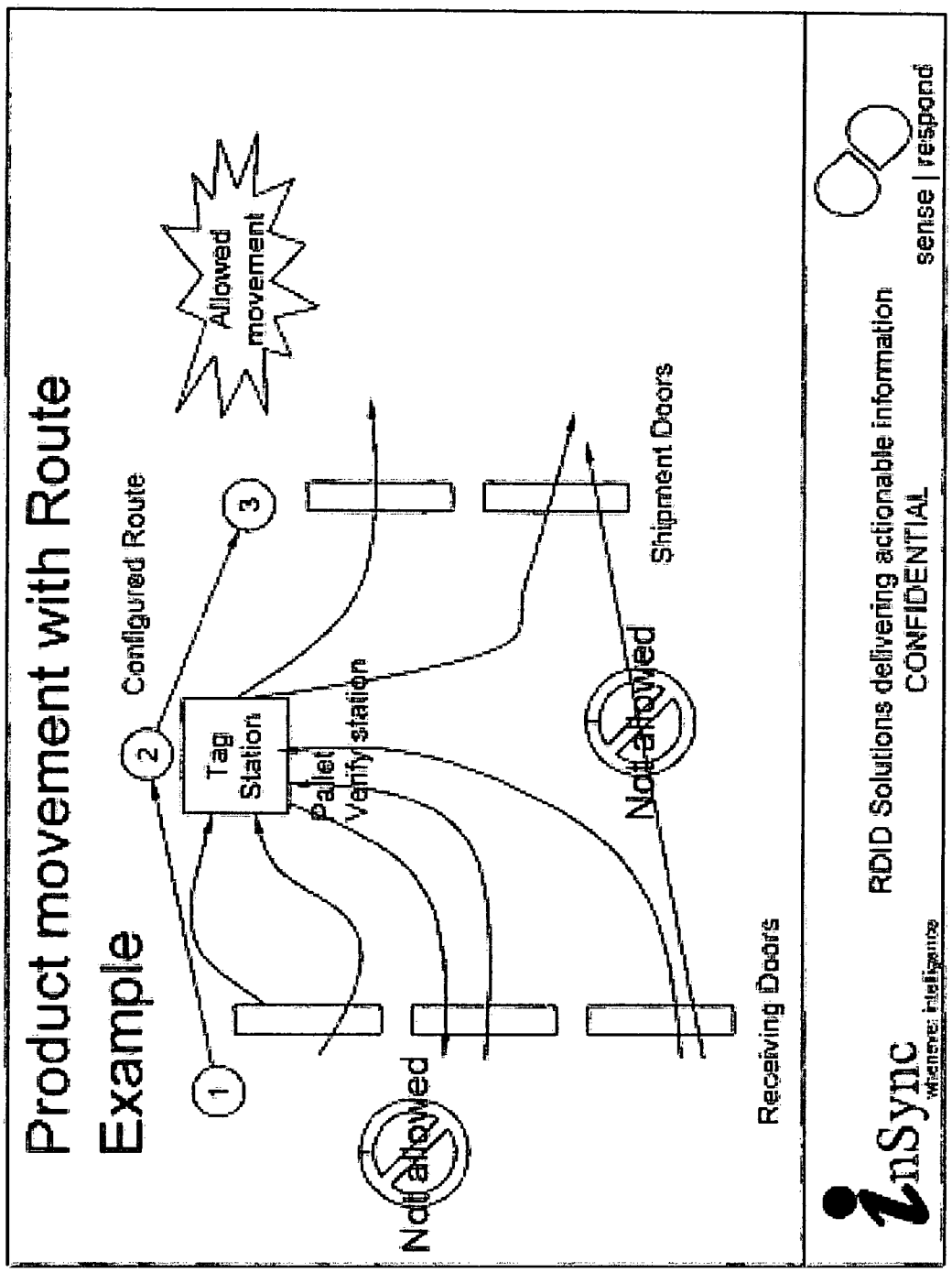
FIG. 22 illustrates how product movement may be controlled.
Figure 23:
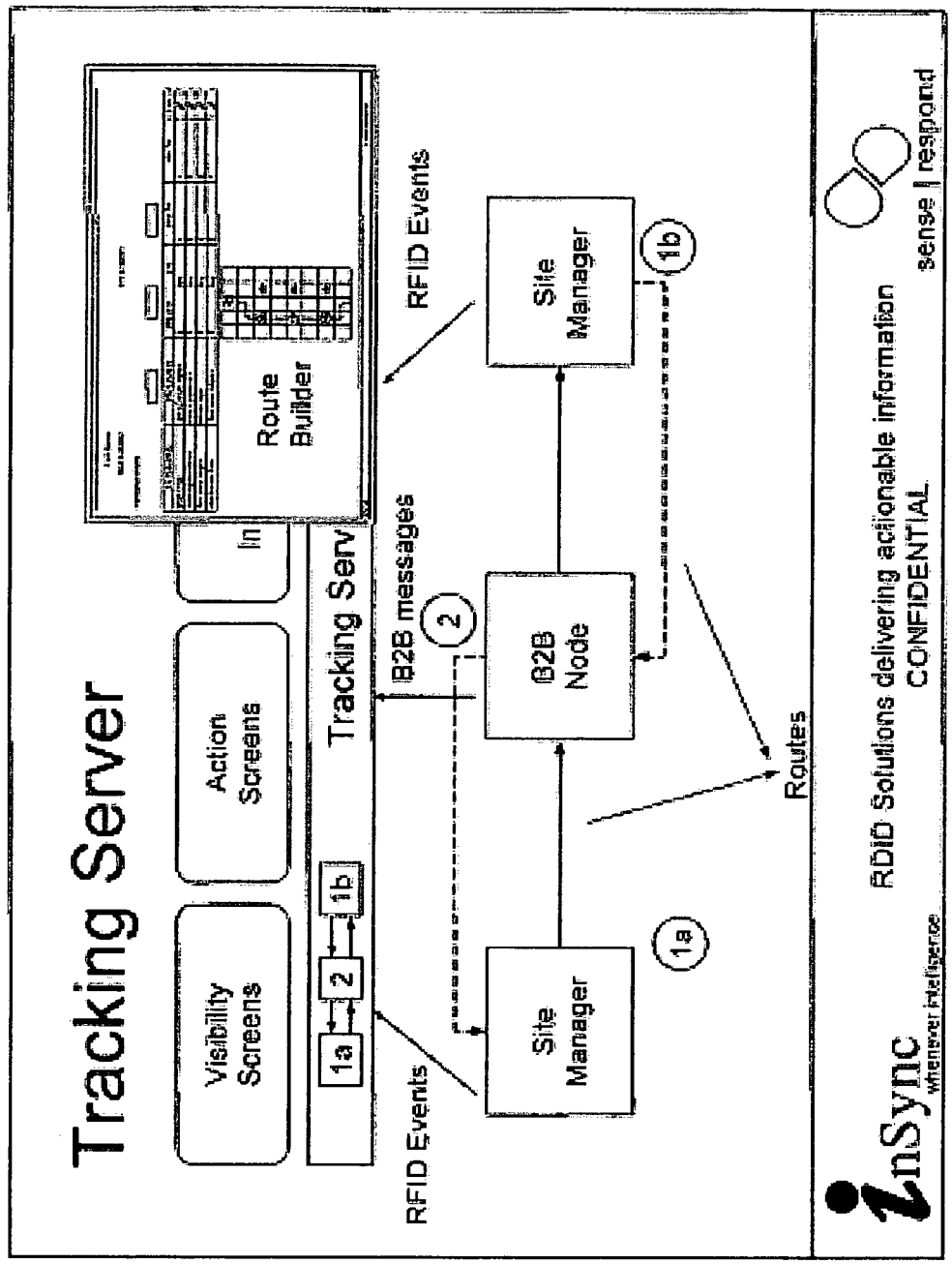
FIG. 23 illustrates a tracking server.

FIG. 22 illustrates how product movement may be controlled and FIG. 23 illustrates a tracking server.

Figure 24A:
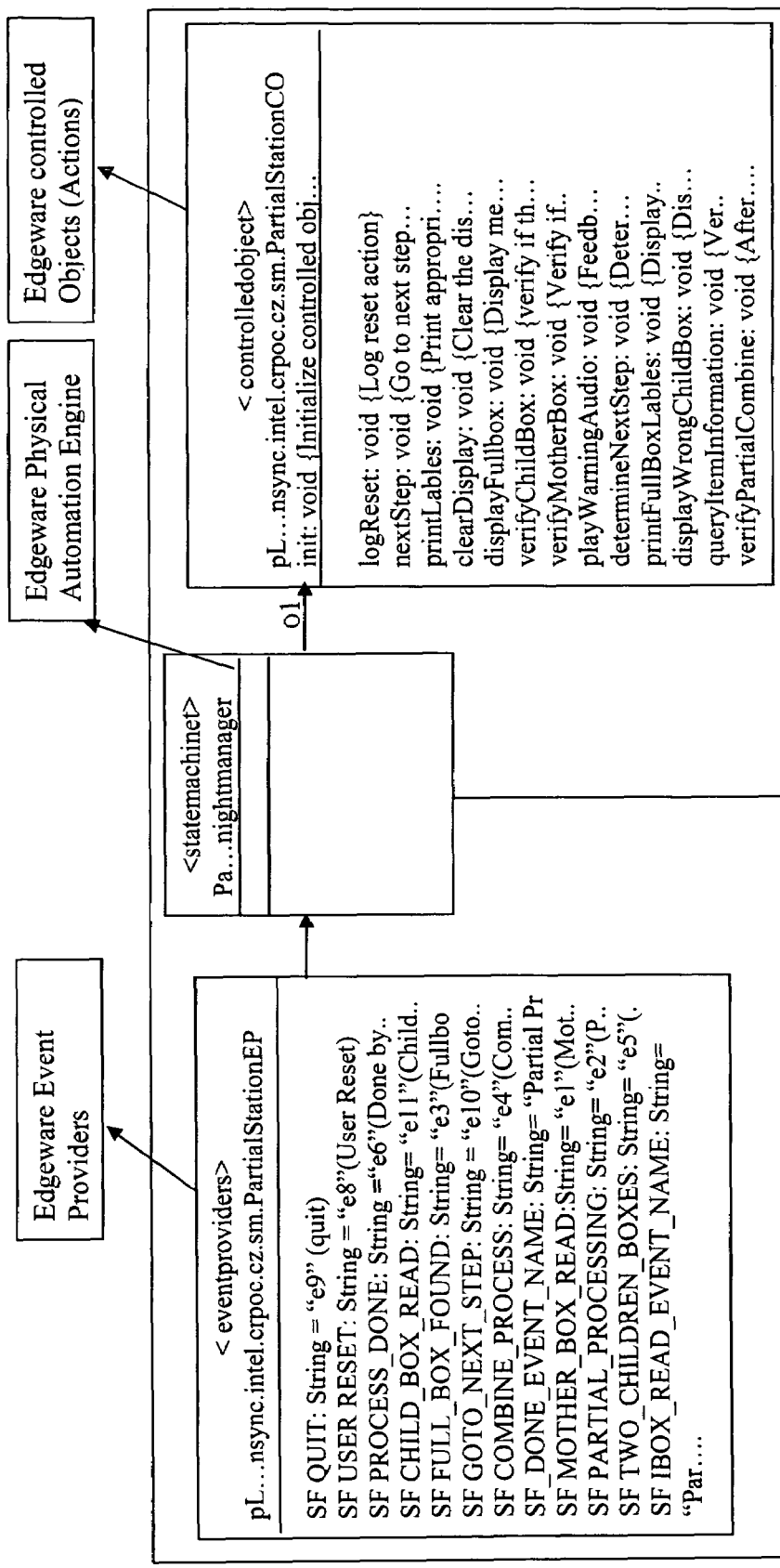
FIG. 24 illustrates a physical automation engine implementation such as a computer model or state machine.
Figure 24B:
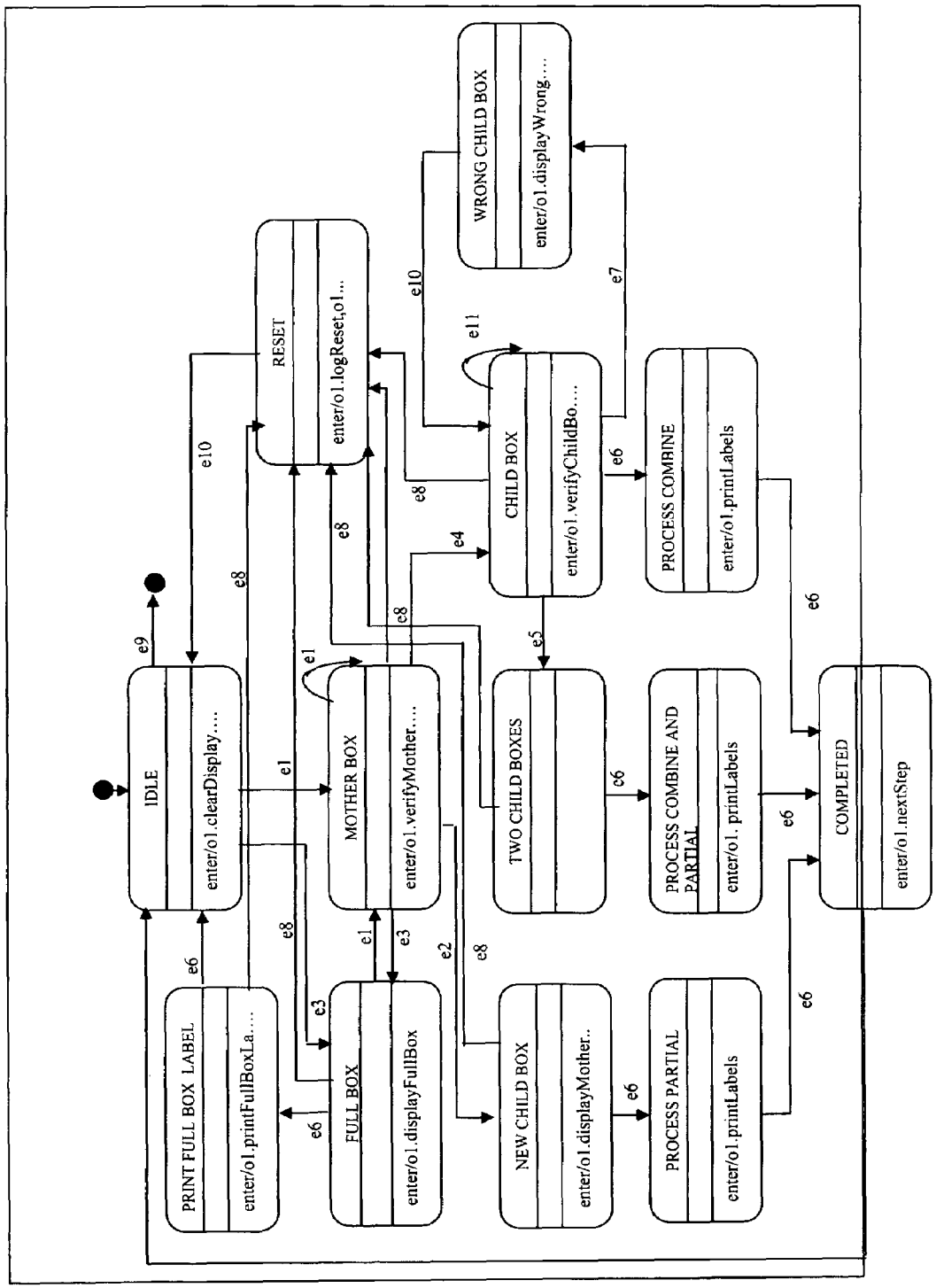

Referring now to FIG. 24, many businesses use warehouses and distribution centers to prepare items or widgets that they produce to be shipped to their end customers. A nearly universal problem that businesses face is the high degree of manual steps involved and the high percentage of errors incurred in this process due to the manual nature of the processes involved.

These manual tasks may be eliminated by automating the steps that are manually being performed resulting in significant operational efficiencies and high data integrity and quality. The automation system can be used in other manufacturing or business operations that involves the location and identification.

The system may be described by explaining how the following business scenario can be implemented.
  Objective:
  To automate the process of combining widgets from two boxes (say 100 in box 1) and (200 in box 2) moving on a conveyor system and create a new box with 145 widgets by
    (a) stopping the conveyor system
    (b) automatically reading the ID of the boxes
    (c) Printing new labels for the box 1 with 145 widgets and
    (d) Printing an updated label for box 2 with 155 widgets and
    (e) Weigh box 1 and dynamically print label with the weight
    (f) Drive a display to prompt the user the appropriate screen with the correct widgets in each of the reconfigured boxes.

Method:

A control zone is created to automate this task by combining the following hardware devices 1. RFID Reader
2. Label Printer
3. Weighing Scale
4. A computer display Control zone software is running on a computer to connect to each of these devices using device drivers that implement the device specific logic. The device drivers output data that is then processed by the control zone engine. To implement the physical workflow described in (a) thru (f), at design time there a physical workflow is implemented using a configurable state machine. This state machine implements the logic described using a library of Events (Event Provider) and a library of controlled objects (Actions). Events can come from the devices that are connected to the control zone or any applications (like ERP or other legacy applications or B2B systems). Based on the event there is/are a set of actions that are performed by the Controlled Objects software. To create a new physical flow requires the creation of a state machine. This is accomplished through configuration by first selecting the events from the Event Providers and appropriate actions from the Controlled Objects. The state machine is then built to automate the specific physical activity.

Figure 25:
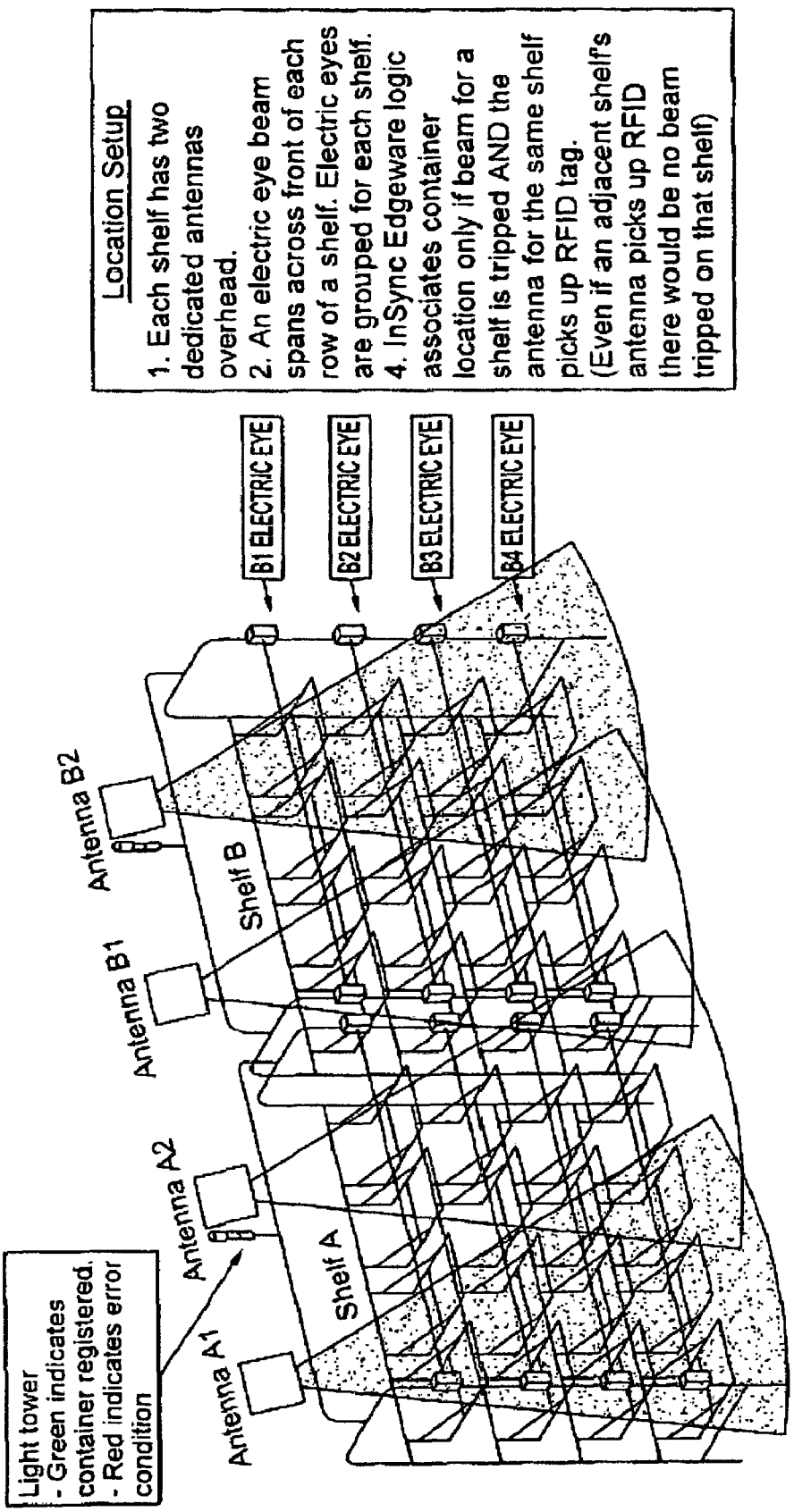
FIG. 25 illustrates the operation of RFID tags with a storage or shelving unit.

Referring now to FIG. 25, in another embodiment, location information for tracking material in a manufacturing facility is provided.

In this section, we will outline one potential scenario for using the automation system for SORT area Lot tracking. In semiconductor manufacturing. This is an example where the use of multiple sensor devices (RFID readers and optical beams) are used to infer information about the location of a Lot that has been tagged with an inexpensive UHF tag. The Event providers and Controlled Objects are used to accomplish this business scenario.

GEN 2 EPC compliant RFID tags have been used, UHF readers ensuring that the technologies can be deployed across geographies, Optical light beam based sensors to detect that material has arrived or left. We also use these sensors to turn the readers on only when needed.

A fixed shelf configuration is shown in FIG. 25 in which UHF antennas may be placed to provide full coverage to read all lots on the shelf. An electric beam is used to ensure that a particular read belongs to which shelf.

In addition, the readers can be turned on only when the electric eye beam is broken thereby minimizing any interference impacts.

Figure 26:
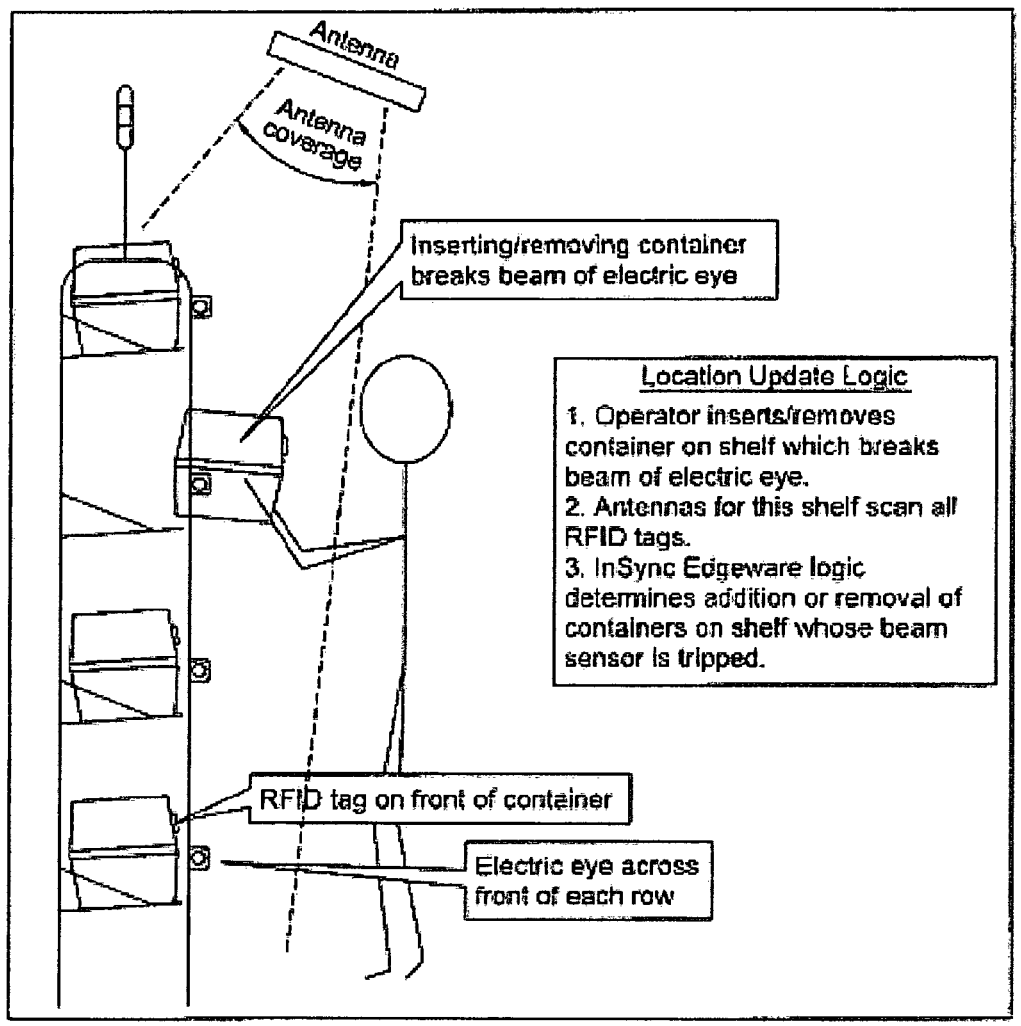
FIG. 26 is a side view of the shelving unit of FIG. 26.

Referring now to FIG. 26, a side view of the shelf also illustrates the placement of the antenna, electric eye and RFID Gen 2 label with respect to the operator. control zone state machine can be configured to detect when a lot has arrived on the shelf, a lot has been removed and a lot has been there on the shelf. Each shelf is also equipped with a light bar to provide visual cues on a good read. This is also a tool to handle error and normal scenarios.

Below is a list of benefits using shelf antennas with an electric eye:

One EPC compliant Gen 2 RFID tag (combined with barcode label or other texts) on front of container where operator can see No need for individual sensor per bin location on shelves No special procedure needed by operator when placing container on shelf Application logic uniquely identifies lots on shelf Logical grouping of matched antennas and electric eyes for each shelf to uniquely associate container with a single shelf (even if adjacent shelf's antenna picks up RFID tag, there would be no beam tripped on that shelf)

Able to distinguish real container placement on shelf versus passing containers on cart Control light tower to provide visual cues to operator on status of RFID scan and location registration

Figure 27:
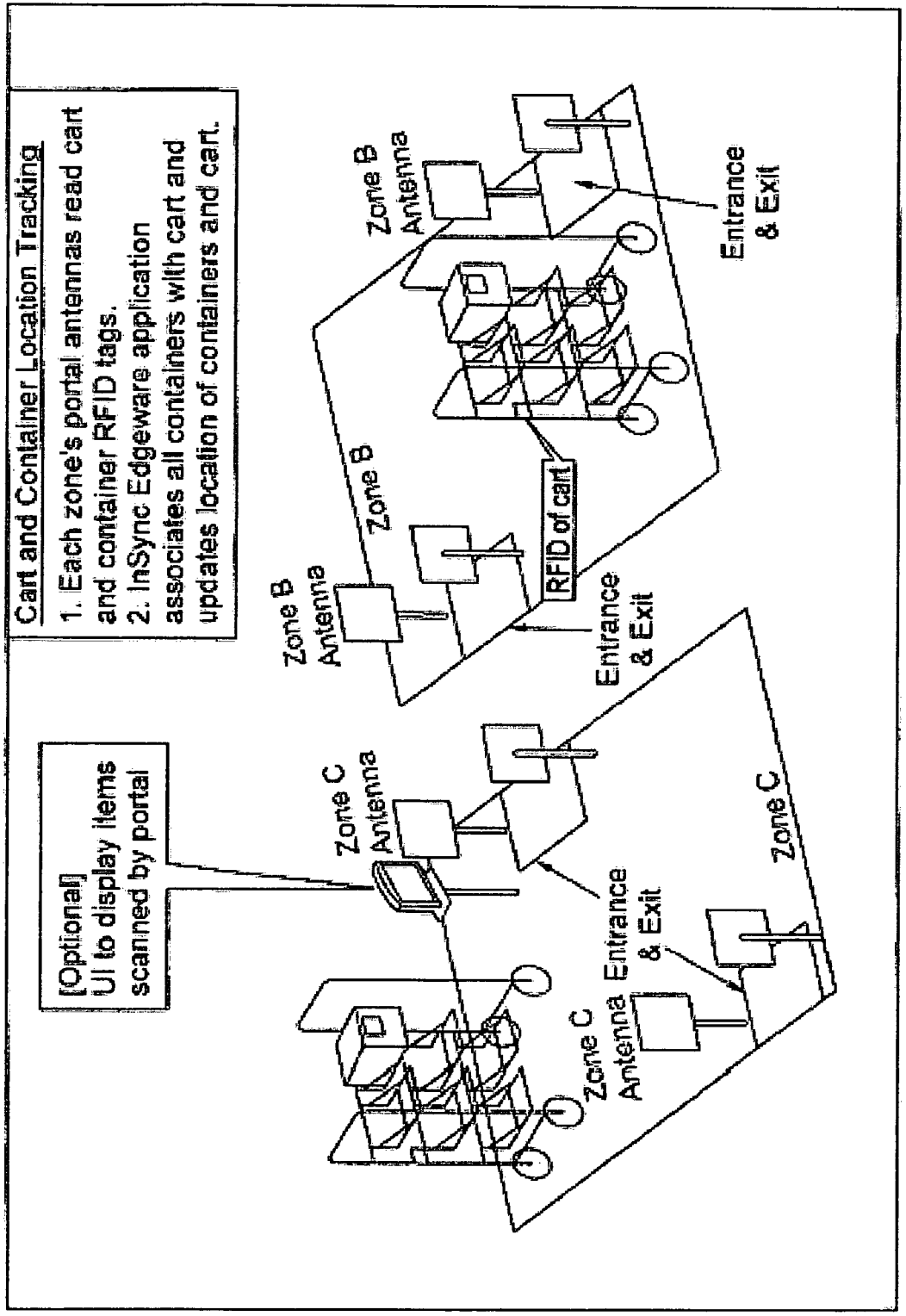
FIG. 27 is a top view illustration of a mobile cart or container tracking system.

[optional] display list of scanned items next to entrance/exit portals where operator can easily verify Referring now to FIG. 27, the location of the mobile cart and its contents will be described. Several UHF readers will map the area and sub-areas of the sort facility (a function of the granularity required for locating the cart). The cart will be equipped with a Cart ID tag (another EPC Gen 2 tag). The door portal design will incorporate RFID antennas to read the cart tag and all the lot ids. In addition there will be a light bar and buzzer or optionally a flat panel display to ensure 100% reads on the cart. The control zone software provides the co-ordination between these devices (RFID and PLC based I/O) as well as inference logic to ensure 100% readability and location of the mobile carts. In addition, the readers can be intelligently turned on/off as needed to minimize any potential interference.

Figure 28:
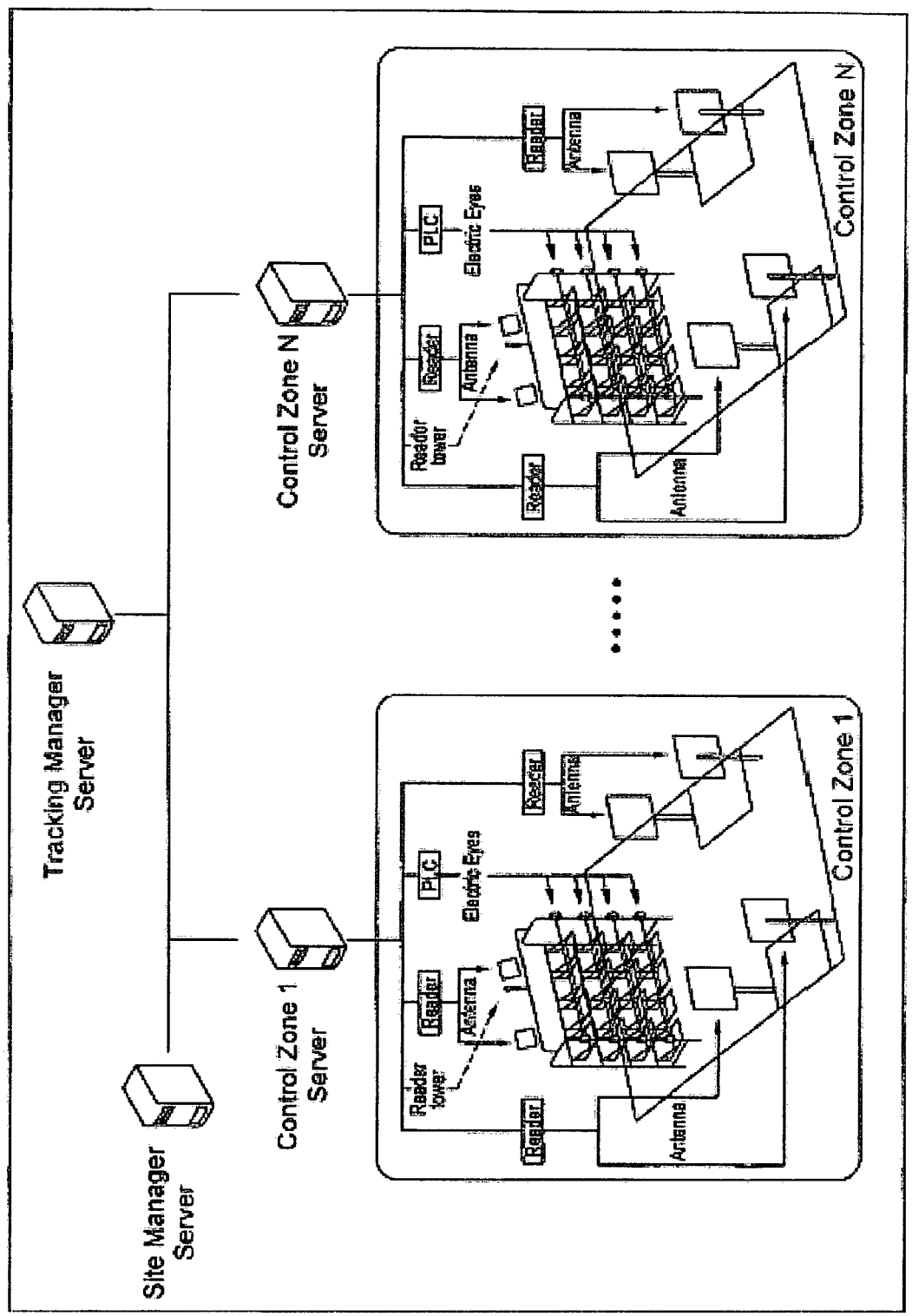
FIG. 28 is a top view of a tracking manager server and associated site manager and multiple control zone servers.

FIG. 28 below shows the system deployment topology in which 2 zones are used.

Figure 29:
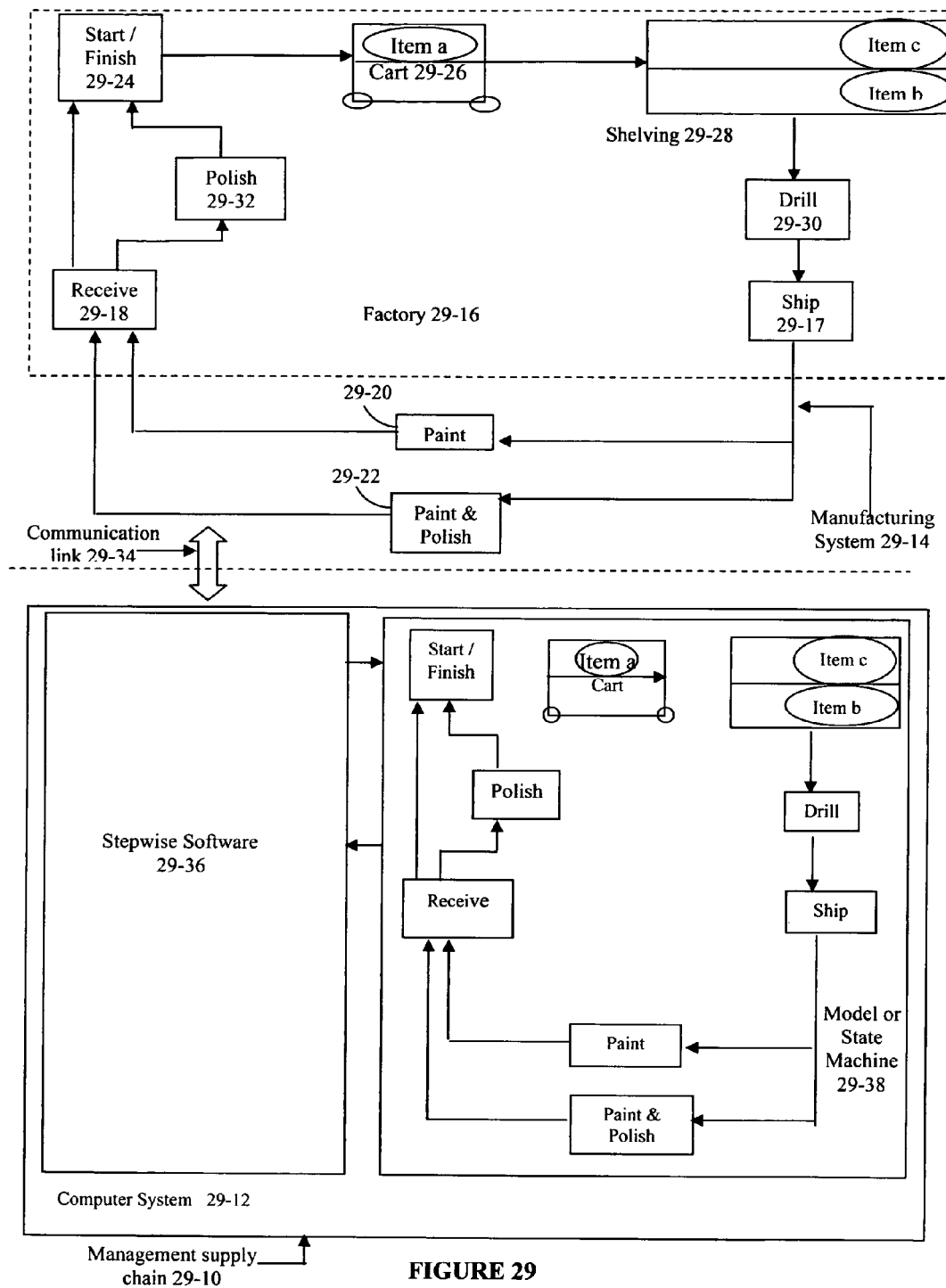
FIG. 29 is an alternate embodiment illustrating the use of a state machine or model in the computer system.

Referring now to FIG. 29, managed supply chain system 29-10 is provided to illustrate the use of a state machine model in the computer software system, and includes computer system 29-12, running software as described herein and manufacturing system 29-14 which includes RFID or other locating tags, detectors and other hardware described above.

Manufacturing system 29-14 provides one example of a portion of a manufacturing system for illustrative purposes. The additional features and arrangements disclosed above with regard to other hardware, software and configurations may also be used. System 29-14 as shown includes factory 29-16 which may include some of the manufacturing steps as well as shipping dock 29-17 and receiving dock 29-18. In order to illustrate the use of a state machine model or analog in the computer system, outside paint facility 29-20 and outside paint and polish facility 29-22 are illustrated outside of factory 29-16.

During the manufacturing or processing of an article of manufacture, item A maybe removed from storage at start/finish cage 29-24 and carried via cart 29-26 to storage shelving 29-28 on which other items are already stored. At an appropriate time, item A may then be moved to drill station 29-30 where it is processed. At another appropriate time, item A may be moved to shipping station 29-26 where it is shipped to paint facility 29-20, which may be an outside vendor. After appropriate processing in the paint facility, item A maybe returned to factory 29-16 via receiving dock 29-18 for processing in polish facility 19-32 for eventual return to start/finish cage 29-24. Although these few specific steps have been identified for illustrative purposes, it is clear that a typical manufacturing process will be much more complex with many other tasks and stations within the factory and, perhaps, many more outside facilities and/or third party vendors. Similarly, the path shown from the start/finish cage may terminate in may cases at a customer's site.

Using the example described above, a simple alternate route may be described. For a particular item, item A, when it is ready for shipping in shipping dock 29-17, the availability and or costs of the outside vendors may make it more desirable for the item to be shipped to outside paint & polish facility 29-22 for return to start/finish cage 29-24 directly from receiving dock 29-18. For example, although it may be less expensive for item A to be painted in outside facility 29-20 and polished in inside polish facility 29-32, when compared to the costs encountered at paint & polish facility 29-22, there may be reasons under certain circumstances such as time deadline why it would be more appropriate to use paint and polish facility 29-22 and, perhaps, have the item dropped shipped to the final or next customer.

The actual problem or issue permitting an alternate selection described herein may be somewhat trivial, and may be handled manually or even by means of a conventional workflow software system identifying the various choices. However, in a more typical real life manufacturing situation, the issues may become extremely complex and/or the time window for making such choices in a cost effective manner may be very short. Further, an enormous amount of real time information is required in a timely manner, for example regarding the location, time at location and time between locations of item a and various other items that may affect the workflow as well as the projected timelines and costs of the various outside vendors as well as the customer's constraints including cost and delivery time sensitivities.

The RFID tags and sensors and systems described above can provide the required real time information in a timely manner and apply that information to computer system 29-12 via communication link 29-34 which may include a wide variety of the various known communication systems. However, the inventors have discovered that the conventionally available software, such as existing workflow software systems, do not function well in this situation. Known workflow software systems use step wise or linear programming which in a simple implementation processes a single computing step and then another. In more complex computers, a series of threads or linear processes may be operating virtually or actually in parallel. Even so, it may be extremely difficult to handle the tasks described herein with such conventional workflow computing software.

A portion of the computing required in system 29-12 is in fact processed in this manner and is identified as stepwise software 29-36 which handles input/out, translation and almost all data processing tasks. Model or state machine software 29-38, in computer system 29-12, handles the remaining computing task in response to input from stepwise software 29-36. The inputs and data required from manufacturing system 29-14 are applied to computer system 29-12 via communications links 29-34. Much of this data may be applied to state machine 29-38 via stepwise software 29-36 or directly to state machine 29-38 as desirable.

State machine 29-38 is created or configured during the installation of managed supply chain system 29-10 based on input regarding manufacturing system 29-14 and updated on an ongoing basis. State machine 29-38 operates as a model of the manufacturing system and this model is kept current by continuous updating via communication link 29-34. As a model, however, it represents the current state of the manufacturing system but can be perturbed, e.g. a parameter of the model may be changed, to determine how the values of the other parameters will change in response to changes in the first parameter. Similarly, the model or state machine may be optimized for various parameters by testing, for example, to determine the lowest manufacturing costs, or shortest time to customer delivery, for an item based on immediately current conditions and various changes that would result from changes or selection of alternatives in the workflow.

As a result, the use of a model or state machine as part of computer system 29-12 permits the remaining software to treat the model as if it were the actual manufacturing process and to modify it to determine data needed for decisions and optimization strategies. In the scenario described above, regarding the choice between the use of outside paint facility 29-20 together with the factory polish facility 29-32, state machine 29-38 in which its various components are updated to reflect the current conditions of manufacturing system 29-14 can be used to determine which path produces the most desirable results.

One implementation of the use of a state machine or model, together with stepwise (or non-state machine) workflow software to manage a supply chain system using RFID or other sensors to determine item or component data is described above with regard to FIG. 24.

It is important to note that the embodiment shown in FIG. 29, in which a single manufacturing facility has a limited number of stations and makes a routing choice between one of two outside vendors, is intended as a simple illustration of the principles. A typical manufacturing chain will have multiple component manufacturers, each of which may be separate enterprises and receive components alternately from more than one source and may also send their manufactured product to more than one buyer for use as a component in the products or services provided by those buyers to customers, that is, other buyers. Providing supply chain management or value chain management by combining sensors, such as RFID or other presence aware sensors, and model driven software, can easily include multiple entities or manufactures or vendors in which case ebusiness messages such as email, xml or other markup language messages or any other B2B (business to business) communications may be included both in link 29-34 as well as in the individual communication paths.

For example, during transport of product from shipping dock 29-17 of factory 29-16 to either paint or paint & polish facilities 29-20 and 29-22, it may be advantageous to assess the material conditions of the asset or product being moved on a frequent basis. The asset or product might be temperature sensitive. The RFID or other presence aware sensor associated with the product being shipped may include a temperature sensor whose input is combined with the response of the RFID tag so that the temperature information data is made available to the computer system along with the product identification and location data. Using such techniques, the conditions of materials can be assessed as frequently as desired. In some circumstances, it may be more appropriate to assess such conditions by exception. That is, if a particular product is temperature sensitive and should not be exposed to a temperature of greater than 80° C., it may be more convenient to indicate the temperature condition of the product only the temperature exceeds that critical temperature and thereby reduce processing overhead. This may easily be accomplished by providing a threshold in the temperature sensor so that a temperature indication is only presented to the computer system when the critical temperature has been reached or exceeded.

In other embodiments, it may be appropriate to have the sensor indicate the temperature without regard to the critical temperature which can be set in different places in the communication chain from the RFID receiver through communications link 29-34 or even in computer system 29-12. This approach may be convenient, for example, if there are different critical temperatures for the product at different stages during its production cycle. In this way, the computer system may infer different critical temperatures, or other conditions, based on inferences from rules, for example, the raw material may not have a critical temperature and the rules may indicate that the component or product has different critical temperatures during different portions, or within different routes, during the production process. Although this example was discussed in terms of temperature, sensors can be used other parameters such as pH, contamination and etc.

The invention claimed is:

1. A method for acquiring and managing data relating to item-level movement of products, product type, or other objects comprising the steps of—
    affixing a RFID tag to each item initialized with at least a product ID code unique to the product type and a serial number unique to the specific product or object,
    scanning the RFID tag with an RFID antenna or other radio frequency scanner to determine the product ID code, serial number, and current location,
    receiving the scanned data from said RFID scanner into a local control node computer,
    transmitting said scanned data from said control node computer through an electronic data network to an RFID tracking server,
    creating a data record on said tracking server to contain said scanned data,
    supplementing said scanned data with static reference data pertaining to the product and manufacturer,
    further supplementing the scanned data with business context information such as invoice, purchase order, repair order or maintenance request, and
    recording said scanned data and said supplemental data in one or more data records in an electronic data storage and retrieval system.

2. The method of claim 1 further comprising:
    using a state machine computer model of a workflow process for the products, product type, or other objects with the data records in the data storage and retrieval system to automatically manage the workflow process.

3. A method for acquiring and managing data relating to item-level movement of products, product type, or other objects comprising the steps of—
    affixing an RFID tag to each item initialized with at least a product ID code unique to the product type and a serial number unique to the specific product or object,
    scanning the RFID tag with an RFID antenna or other radio frequency scanner to determine the product ID code, serial number, and current location,
    receiving current scanned item data from said RFID scanner into a local control node computer,
    creating a predefined process plan containing a digital representation of process steps to be followed, including the control node, action steps, shipment destination, carrier, and any constraints or conditions,
    comparing for said current scanned item data the current location of scanned item with the control node and time limits contained in said pre-defined process plan, and
    issuing a message to a user regarding conformance of the received scanned item data to the pre-defined process plan.

4. The method of claim 3 wherein the digital representation further comprises:
    a state machine computer model.

5. A method for acquiring and managing data relating to item-level movement of products, product type, or other objects comprising the steps of—
    affixing an RFID tag to each item initialized with at least a product ID code unique to the product type and a serial number unique to the specific product or object,
    dividing a given storage or work area into a pre-defined grid of cells, in which each cell has a pre-defined cell ID number, and in which each cell has an RFID tag affixed either in the cell or nearby, the RFID tag having a unique tag number,
    creating and storing a series of digital records containing a pre-defined cell locations, cell ID numbers, and unique RFID tag numbers,
    scanning, using a handheld or other RFID reader wand, the RFID tag of an item to be stored,
    scanning, using a handheld or other RFID reader wand, the RFID tag of the location cell into which the item is being stored,
    receiving by a RFID Tracking Server the data from the two scans, of the item to be stored and the storage cell tag,
    associating by the RFID tracking server the unique grid cell location tag ID with the RFID tag data for the item to be tracked, and
    recording the grid cell location data in a RFID tracking database in association with the data for the tracked item, such that the scanned grid cell location is entered as now being the current location of the tracked item.

6. The method of claim 5, further comprising:
    using a sate machine model of a workflow process involving the products, product type, or other objects together with the data collected by the RFID tracking server to mange the workflow process.

* * * * *